(12) United States Patent
Yamamoto et al.

(10) Patent No.: US 7,716,696 B2
(45) Date of Patent: May 11, 2010

(54) TELEVISION RECEIVER, INFORMATION PROCESSING METHOD AND PROGRAM

(75) Inventors: Takashi Yamamoto, Kanagawa (JP); Masaki Kutsuna, Aichi (JP); Yuichi Matsumoto, Kanagawa (JP); Shigeki Mori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1412 days.

(21) Appl. No.: 10/998,744

(22) Filed: Nov. 30, 2004

(65) Prior Publication Data

US 2005/0128351 A1   Jun. 16, 2005

(30) Foreign Application Priority Data

Dec. 15, 2003 (JP) .............................. 2003-416733

(51) Int. Cl.
H04N 7/16 (2006.01)
H04N 7/173 (2006.01)
H04N 7/00 (2006.01)

(52) U.S. Cl. ..................... 725/9; 725/109; 725/110; 725/112; 725/135; 348/473

(58) Field of Classification Search .............. 328/14.08, 328/14.1; 725/24, 109, 110, 112, 135, 142, 725/151

See application file for complete search history.

(56) References Cited

U.S. PATENT DOCUMENTS

| 6,252,629 | B1 * | 6/2001 | Takatori | 348/460 |
| 6,339,842 | B1 * | 1/2002 | Fernandez et al. | 725/133 |
| 6,754,904 | B1 * | 6/2004 | Cooper et al. | 725/32 |
| 6,853,985 | B1 * | 2/2005 | Yamashita et al. | 705/51 |
| 7,464,393 | B2 * | 12/2008 | Westlake et al. | 725/39 |
| 2002/0063797 | A1 | 5/2002 | Aratani et al. | |
| 2002/0138829 | A1 | 9/2002 | Matsumoto et al. | |
| 2003/0033603 | A1 | 2/2003 | Mori et al. | |
| 2003/0142236 | A1 | 7/2003 | Aratani et al. | |
| 2003/0208778 | A1 | 11/2003 | Aratani et al. | |
| 2004/0049788 | A1 | 3/2004 | Mori et al. | |
| 2004/0068746 | A1 | 4/2004 | Mori et al. | |
| 2004/0078472 | A1 | 4/2004 | Mizutome et al. | |
| 2004/0117830 | A1 | 6/2004 | Ohno et al. | |
| 2004/0148629 | A1 | 7/2004 | Shibamiya et al. | |
| 2004/0158859 | A1 | 8/2004 | Aoyama et al. | |
| 2004/0179811 | A1 | 9/2004 | Kikkawa et al. | |
| 2004/0231003 | A1 * | 11/2004 | Cooper et al. | 725/135 |
| 2004/0261136 | A1 | 12/2004 | Aratani et al. | |
| 2005/0262542 | A1 * | 11/2005 | DeWeese et al. | 725/106 |
| 2006/0123447 | A1 * | 6/2006 | Westlake et al. | 725/40 |

FOREIGN PATENT DOCUMENTS

| CN | 1282178 A | 1/2001 |
| JP | 6-217307 | 8/1994 |
| WO | WO 02/100101 A2 | 12/2002 |

* cited by examiner

*Primary Examiner*—Joseph P Hirl
*Assistant Examiner*—Mary Anne Kay
(74) *Attorney, Agent, or Firm*—Fitzpatrick, Cella, Harper & Scinto

(57) ABSTRACT

A television receiver includes: broadcast wave receiving means for receiving a broadcast wave; obtaining means for obtaining information for specifying a program being a common program of programs received in accordance with first program information related to a receivable broadcast and programs received in accordance with second program information different from the first program information, said program having starting time of broadcast earlier in said first program information than in said second program information; and recording means for recording said program specified by said information.

9 Claims, 35 Drawing Sheets

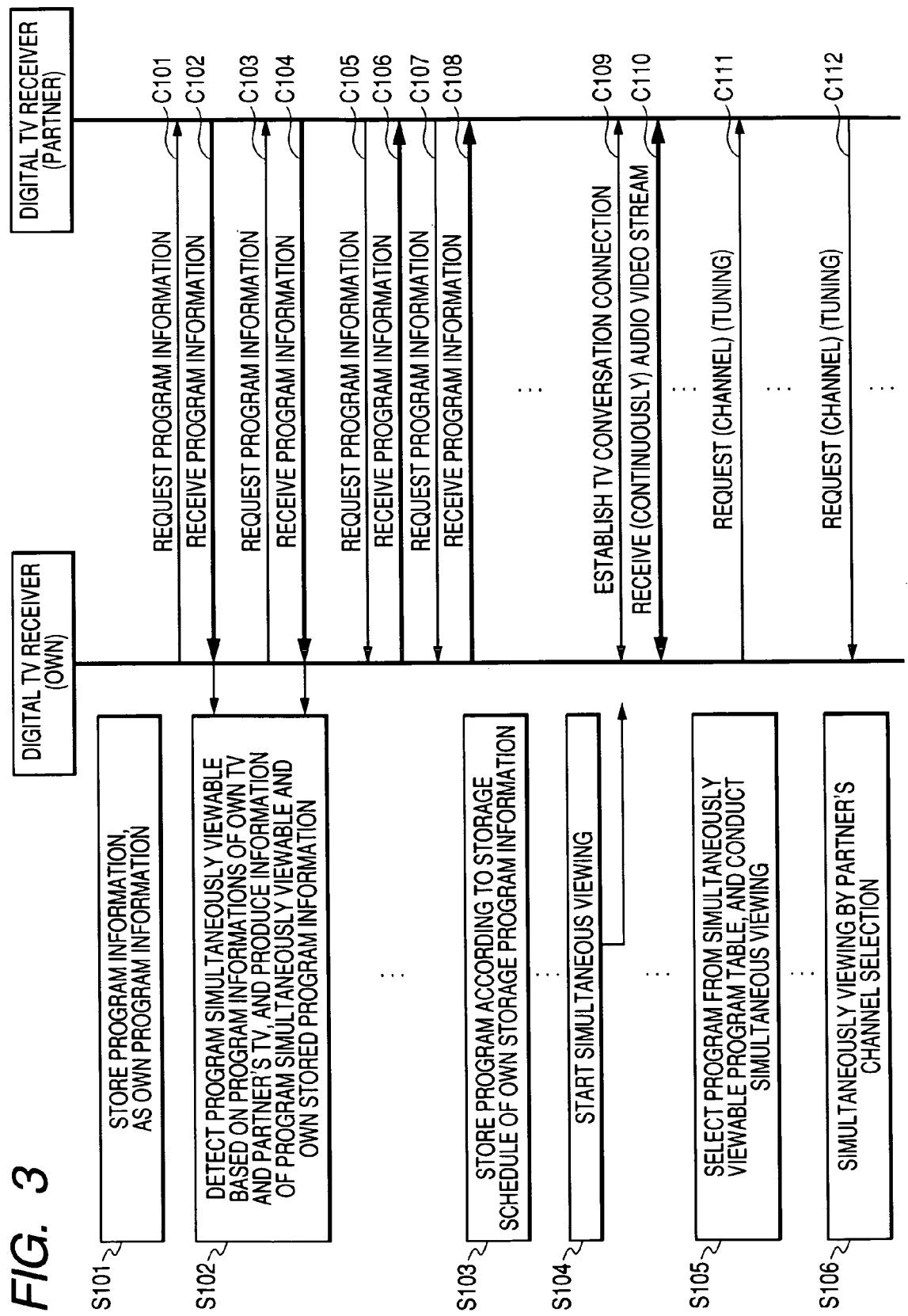

FIG. 4A

| | BROADCASTING STATION A | BROADCASTING STATION B | BROADCASTING STATION C |
|---|---|---|---|
| TIME | CH=1 | CH=2 | CH=3 |
| 01:00 | PROGRAM a1 | PROGRAM b1 | PROGRAM c1 |
| 02:00 | PROGRAM a2 | PROGRAM b2 | PROGRAM c2 |
| 03:00 | | PROGRAM b3 | |
| 04:00 | PROGRAM a3 | PROGRAM b4 | |
| | PROGRAM a4 | | PROGRAM c3 |
| 05:00 | | | |

FIG. 4B

| | BROADCASTING STATION A | BROADCASTING STATION D | BROADCASTING STATION B' |
|---|---|---|---|
| TIME | CH=1 | CH=2 | CH=3 |
| 01:00 | PROGRAM a1 | PROGRAM d1 | PROGRAM b1 |
| 02:00 | PROGRAM a2 | PROGRAM d2 | PROGRAM b3 |
| 03:00 | | | PROGRAM e |
| 04:00 | PROGRAM a3 | PROGRAM d3 | |
| | PROGRAM a4 | | PROGRAM b2 |
| 05:00 | | | |

FIG. 15A
SIMULTANEOUSLY VIEWABLE PROGRAM INFORMATION   DATA STRUCTURE

| POSITION ON EPG | | PROGRAM TITLE | OWN PROGRAM DESIGNATION INFORMATION | PARTNER'S PROGRAM DESIGNATION INFORMATION |
|---|---|---|---|---|
| CH | START DATE TIME / END DATE TIME | | | |

FIG. 15B
PROGRAM DESIGNATION INFORMATION

SIMULTANEOUS VIEWING

| SELECTED BROADCASTING STATION | SELECTED CHANNEL | START DATE TIME | END DATE TIME | STATE |
|---|---|---|---|---|
| | | | | RECEIVING BROADCASTING / — |

FIG. 15C
SCHEDULED FOR RECORDING

| SELECTED BROADCASTING STATION | SELECTED CH | START DATE TIME | END DATE TIME | STATE |
|---|---|---|---|---|
| | | | | SCHEDULED FOR RECORDING / — |

FIG. 15D
RECORDING FINISHED

| SELECTED BROADCASTING STATION | SELECTED CH | START DATE TIME | END DATE TIME | STATE |
|---|---|---|---|---|
| | | | | RECORDING FINISHED / CONTENTS DESIGNATION INFORMATION |

FIG. 16A

STORAGE PROGRAM INFORMATION DATA STRUCTURE

| PROGRAM TITLE | SELECTED BROADCASTING STATION | SELECTED CHANNEL | START DATE TIME | END DATE TIME | STATE |

FIG. 16B

| STATE |
|---|
| RECORDING SCHEDULED |
| — |

FIG. 16C

| STATE | CONTENTS DESIGNATION INFORMATION |
|---|---|
| RECORDING FINISHED | |

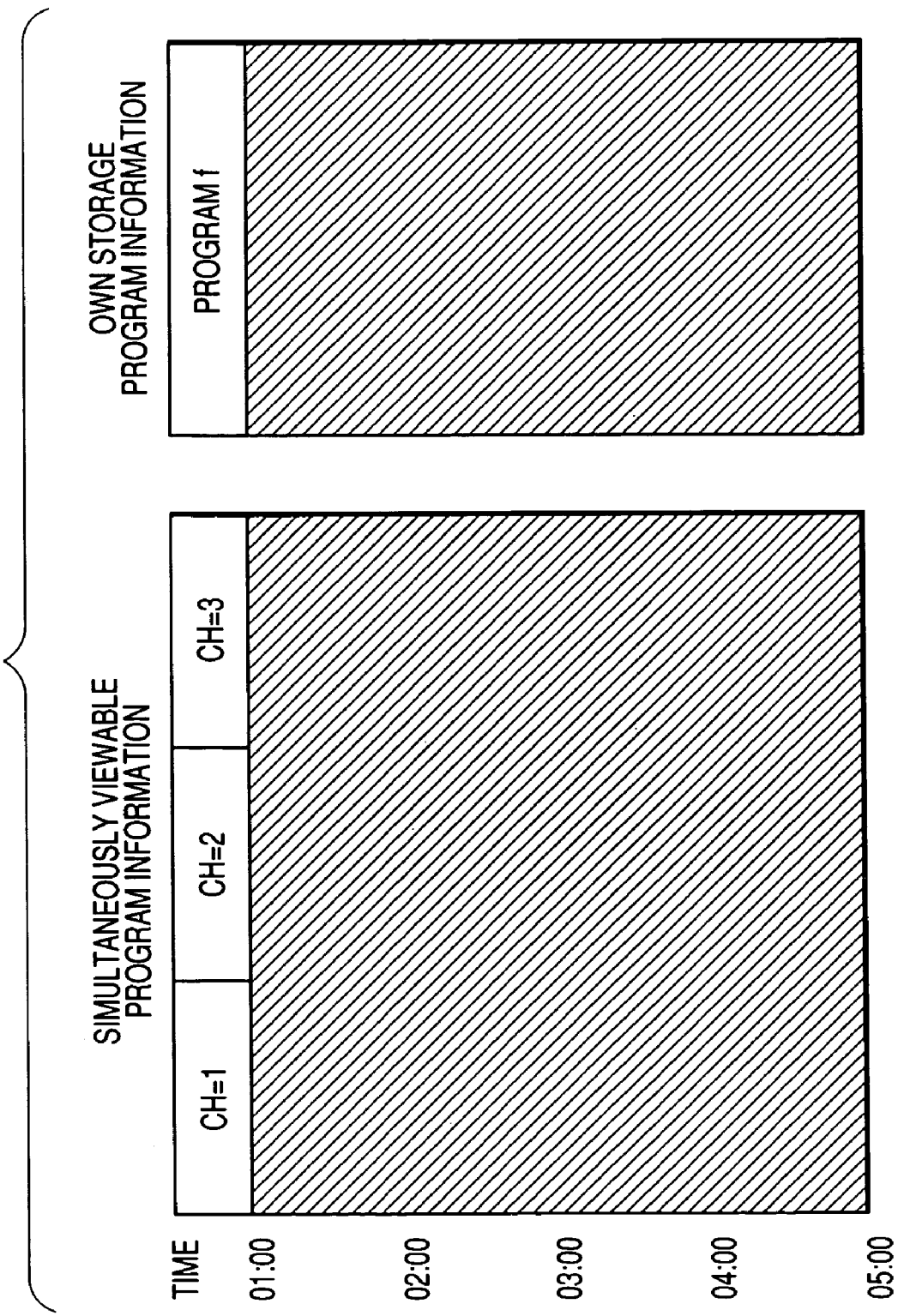

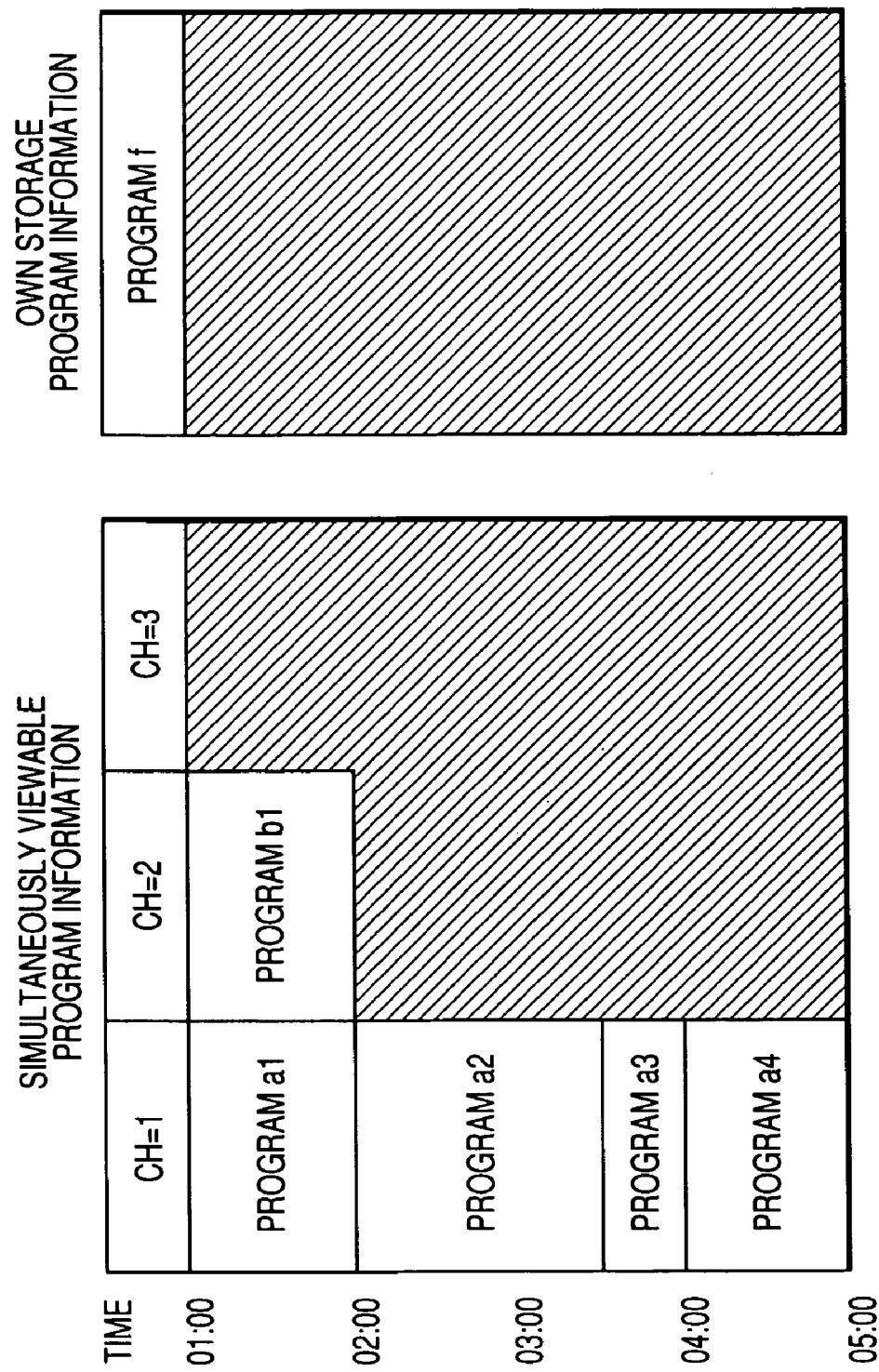

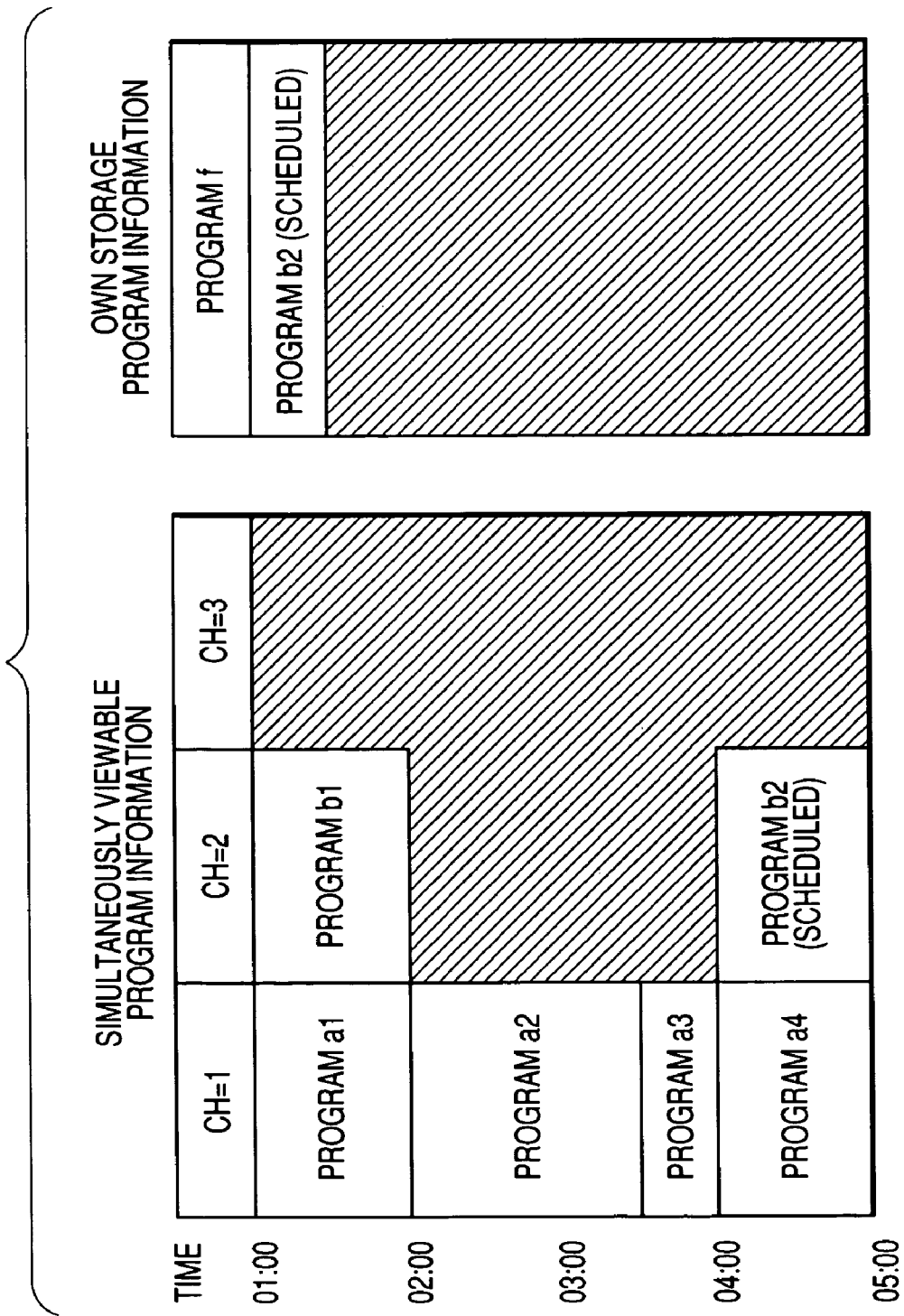

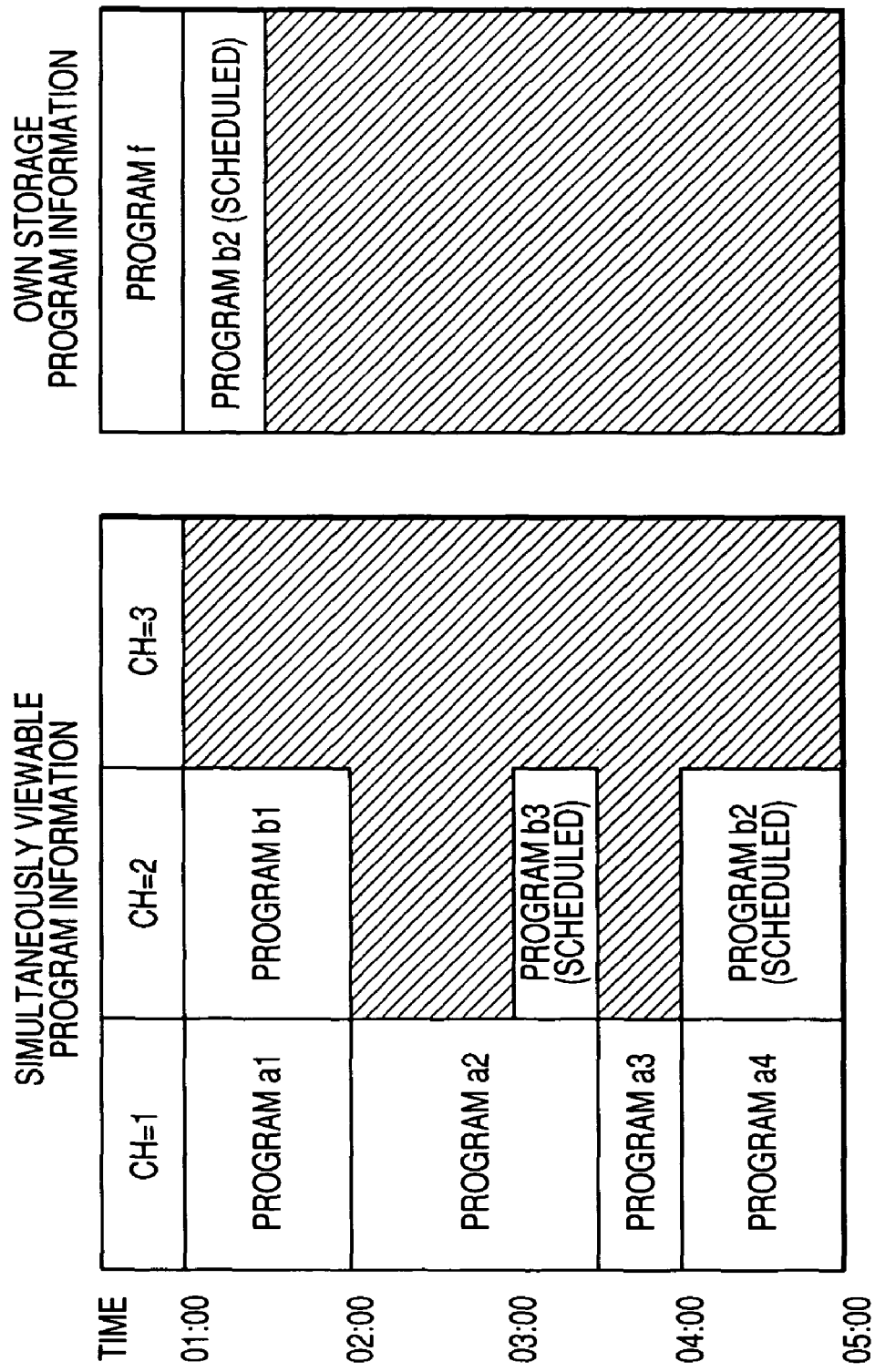

FIG. 29A

STORAGE PROGRAM INFORMATION DATA STRUCTURE

| PROGRAM TITLE | SELECTED BROADCASTING STATION | SELECTED CH | START DATE TIME | END DATE TIME | STATE |
|---|---|---|---|---|---|

FIG. 29B

| STATE | | |
|---|---|---|
| SCHEDULED FOR RECORDING | SCHEDULED FOR RECORDING | STATE — |

FIG. 29C

| STATE | | |
|---|---|---|
| RECORDING FINISHED | RECORDING FINISHED | STATE — CONTENTS DESIGNATION INFORMATION |

FIG. 29D

| STATE | | |
|---|---|---|
| RECORDING SCHEDULED FOR SIMULTANEOUS VIEWING | RECORDING SCHEDULED | STATE RESERVE SIMULTANEOUSLY VIEWING — |

FIG. 29E

| STATE | | |
|---|---|---|
| RECORDING COMPLETED ACCORDING TO RESERVE FOR SIMULTANEOUSLY VIEWING | RECORDING COMPLETED | STATE RESERVE SIMULTANEOUSLY VIEWING CONTENTS DESIGNATION INFORMATION |

FIG. 29F

| STATE | | |
|---|---|---|
| AFTER SIMULTANEOUSLY VIEWING | RECORDING COMPLETED | STATE — CONTENTS DESIGNATION INFORMATION |

FIG. 31

STORAGE PROGRAM

| NO. | PROGRAM TITLE | RECORDING DATE TIME | rsv |
|-----|---------------|---------------------|-----|
| 001 | PROGRAM f | 02/05/26 13:00-14:55 | — |
| 002 | PROGRAM b2 | 02/06/12 02:00-03:00 | rsv |
| 003 | | | |
| 004 | | | |
| 005 | | | |

FIG. 32

"PROGRAM b2" RESERVED FOR SIMULTANEOUSLY VIEWING, OR FOR VIEWING ALONE?

YES  NO

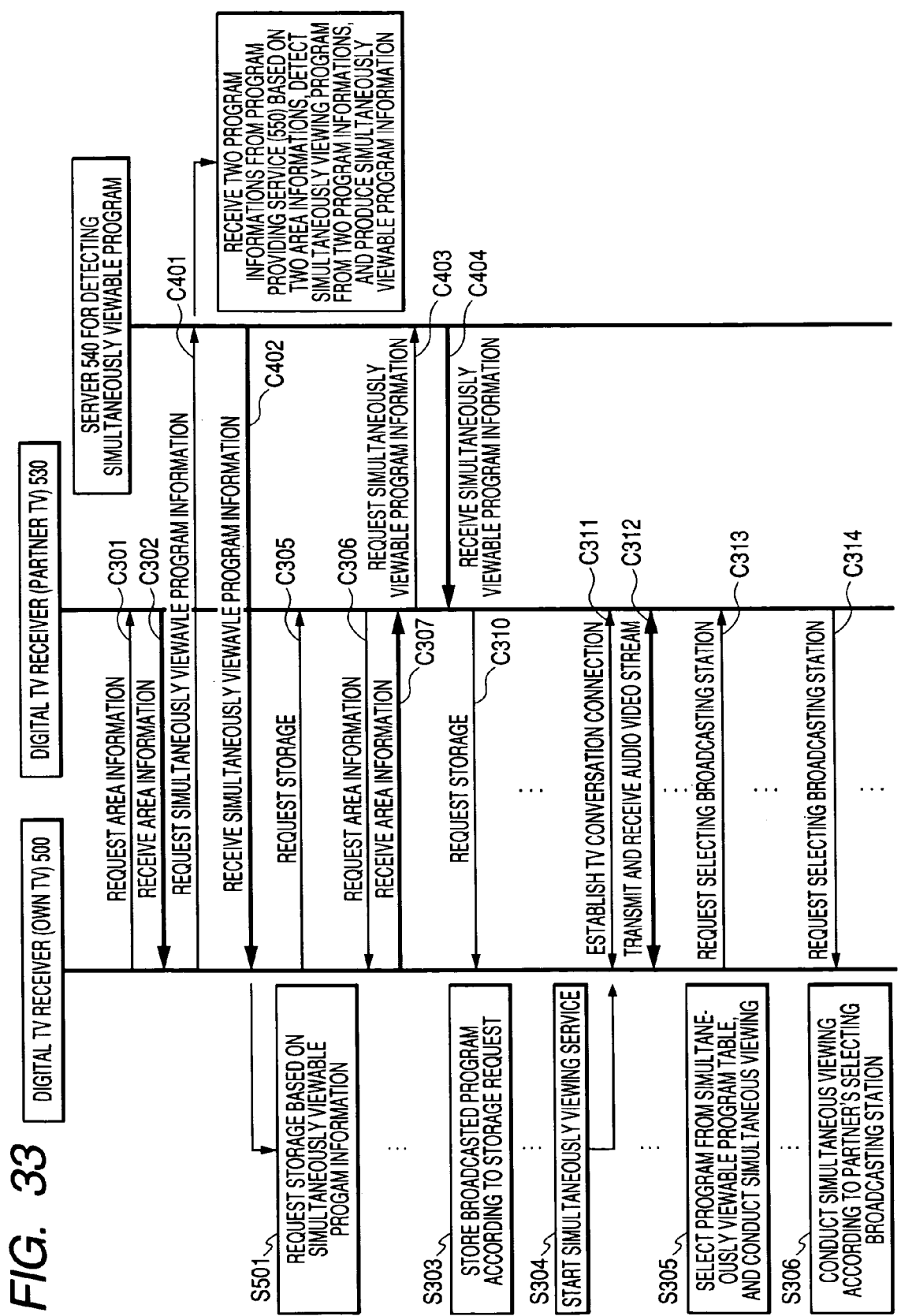

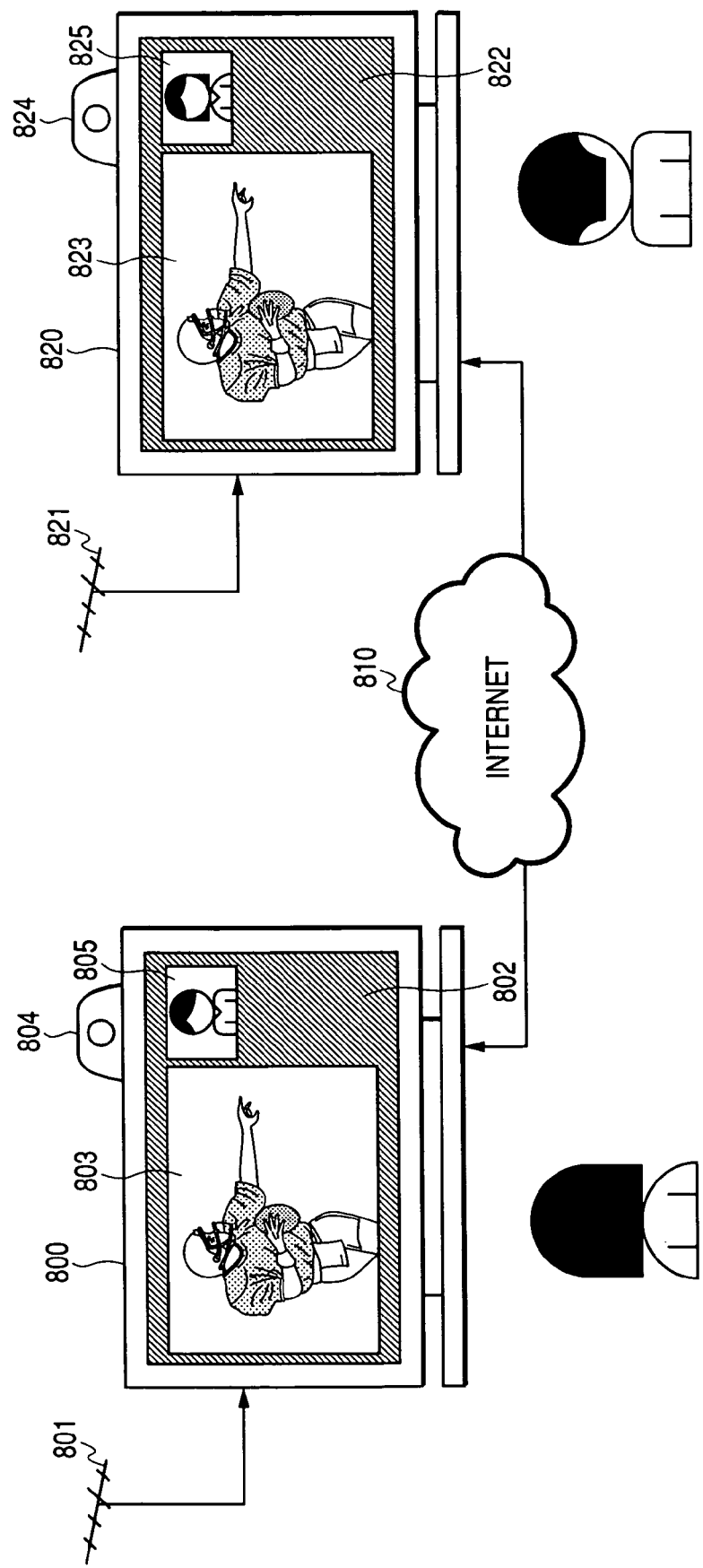

TELEVISION RECEIVER, INFORMATION PROCESSING METHOD AND PROGRAM

BACKGROUND OF THE INVENTION

1. Field of the Invention

The present invention relates to a television receiver, an information processing method and a program, and more particularly to a digital television receiver connected to a network for performing viewing of the same television program as that of the television on the connected partner side, an information processing method for performing viewing the same television program and a program for executing the information processing method.

2. Related Background Art

In a television broadcast using a ground broadcasting wave, a televising broadcast in which many viewers watch a specific program at the same time and opinions of the viewers are transmitted to a broadcasting station for conducting the broadcast program while accepting the opinions has been implemented. An example of a television broadcast system enabling many viewers to participate in a specific program is disclosed in Japanese Patent Application Laid-Open No. H06-217307.

Moreover, the improvement of a network environment has recently advanced, and it has become possible to use a wide band communication widely and easily. Furthermore, by the advance of the technology related to a moving image transmission, the moving image communication using a network has become possible to use it readily.

On such a background, there is a use form in which two televisions are connected by means of bidirectional moving image communication means using televisions and each user manually performs channel selection of the user's television and further the users commonly spend the time for viewing a television program by means of the bidirectional moving image communication while receiving the same television program at the same time.

FIG. 34 is a schematic configuration diagram of such a use. Television receivers 800 and 820 severally have a network connection function and moving image communication means using the network connection function (the so-called television conversation function) besides the receiving function of a television broadcast. The television receivers 800 and 820 are connected to a network 810 including the Internet.

The television receiver 800 receives a television broadcast through an antenna 801 to display the received television broadcast in a television broadcast program display area 803 on a display unit 802. On the other hand, the television receiver 800 transmits moving image information from a camera 804 including an audio video input function to the outside. The television receiver 800 displays the video of the received moving image information of a partner in a partner image display area on the display unit 802, and outputs the audio of the moving image information from a not shown speaker.

A television receiver 820 is also provided with similar configuration and functions to those of the television receiver 800. The television receiver 820 receives a television broadcast through an antenna 821 to display the received broadcast in a television broadcast program display area 823 on a display unit 822. The television receiver 820 transmits moving image information from a camera 824 including an audio video input function to the outside. The television receiver 820 displays the video of the received moving image information of a partner in a partner image display area on the display unit 822, and outputs the audio of the moving image information from a not shown speaker.

The viewers of the television receivers 800 and 820 connected to each other through a network are informed of the air of each other by means of the moving image and sounds of the partners while viewing a common television broadcast program received independently by the respective television receivers. The viewers also have an experience in common as if they were in one living room and were viewing the same television broadcast by means of the so-called television conversation function through the network.

FIG. 4A shows a broadcast schedule of television programs which can be received and be viewed in an area X (television receiver 800). FIG. 4B shows a broadcast schedule of television programs which can be received and be viewed in an area Y (television receiver 820) different from the area X. In the area X, the broadcasts of broadcasting stations A, B and C can be received through channels 1, 2 and 3, respectively. During times 01:00 to 05:00, the programs shown in FIG. 4A can be received and viewed. On the other hand, in the area Y, the broadcasts of broadcasting stations A, D and B' can be received through channels 1, 2 and 3, respectively, as shown in FIG. 4B.

In also the area Y, the broadcasting station A broadcasts the same contents as those in the area X. The television receivers 800 and 820 can simultaneously view the programs of the broadcasting station A, and can simultaneously experience the program viewing by the television conversation function.

The broadcasting station D in the area Y is, for example, a local station in the area Y. In the time zones shown in FIGS. 4A and 4B, the broadcasting station D has no programs in common with those by any broadcasting stations in the area X. That is to say, the broadcasting station D has no programs which can be viewed simultaneously by the television receivers 800 and 820.

The broadcasting station B' is one related to, for example, the broadcasting station B in the area X, and broadcasts common programs b1, b2 and b3 with those of the broadcasting station B. However, the broadcasting station B' also has a program e peculiar to the area X. As shown in FIGS. 4A and 4B, the broadcasting times of the program b1 are the same in each area, but the broadcasting station B' broadcasts programs b2 and b3 at broadcasting times different from those of the broadcasting station B. As a result, the simultaneous experience of viewing by means of the television conversation functions of the television receivers 800 and 820 can be performed only to the program b1.

FIGS. 35A and 35B are views showing the schedules of television programs enabling the television receiver 800 in the area X and the television receiver 820 in the area Y to experience the simultaneous viewing of the programs as a result of the situation in the way which makes it easy to understand. FIG. 35A shows the schedule of programs which the television receiver 800 can simultaneously view, and FIG. 35B shows the schedule of programs which the television receiver 820 can simultaneously view. As described above, the television broadcasts have different broadcasting schedules according to areas. Even to the same program, there is the case where the broadcasting day thereof or the broadcasting time thereof is different according to areas. Consequently, the programs which can be simultaneously viewed are limited.

SUMMARY OF THE INVENTION

It is an object of the present invention to provide a television receiver which can increase the chances of simultaneous viewing.

A first aspect of the present invention is a television receiver including: broadcast wave receiving means for receiving a broadcast wave; obtaining means for obtaining information for specifying a program being a common program of programs received in accordance with first program information related to a receivable broadcast and programs received in accordance with second program information different from the first program information, said program having starting time of broadcast earlier in said first program information than in said second program information; and recording control means for controlling to record said program specified by said information.

Moreover, a second aspect of the present invention is a television receiver including: broadcast wave receiving means for receiving a broadcast wave; obtaining means for obtaining information for specifying a program being a common program of programs received in accordance with first program information related to a receivable broadcast and programs received in accordance with second program information different from the first program information, said program having starting time of broadcast earlier in said second program information than in said first program information; and transmission means for transmitting a record request signal based on said obtained information to another television receiver through a network in order to record said program specified by said information in accordance with said second program information.

Moreover, a third aspect of the present invention is an information processing method including: a broadcast wave receiving step of receiving a broadcast wave; an obtaining step of obtaining information specifying a program being a common program of programs received in accordance with first program information related to a receivable broadcast and programs received in accordance with second program information different from the first program information, said program having starting time of broadcast earlier in said first program information than in said second program information; and a recording control step of controlling to record said program specified by said information.

Moreover, a fourth aspect of the present invention is an information processing method including: a broadcast wave receiving step of receiving a broadcast wave; an obtaining step of obtaining information specifying a program being a common program of programs received in accordance with first program information related to a receivable broadcast and programs received in accordance with second program information different from the first program information, said program having starting time of broadcast earlier in said second program information than in said first program information; and a transmission step of transmitting a record request signal based on said obtained information to another television receiver through a network in order to record said program specified by said information in accordance with said second program information.

According to the present invention, the simultaneous viewing of such programs as ones in different channels at the same time and ones at different times independent of channels as well as of the programs in the same channel at the same time is enabled.

BRIEF DESCRIPTION OF THE DRAWINGS

FIG. 3 is a flow chart of the simultaneous viewing operation of the first embodiment of the present invention;

FIG. 4A is an example of own program information and FIG. 4B is an example of partner's program information;

FIG. 15A is an example of the data structure of simultaneously viewable program information, FIG. 15B is an example of the data structure of program designation information in case of simultaneous viewing, FIG. 15C is an example of the data structure of the program designation information in case of being scheduled for recording, and FIG. 15D is an example of the data structure of the program designation information in case of recording finished;

FIG. 16A is an example of the data structure for one program to be registered in the storage program information, FIG. 16B is an example of the data structure of a state in case of being in recording state, and FIG. 16C is an example of the data structure of the state in case of recording finished;

FIG. 25 is simultaneously viewable program information and own storage program information before receiving partner's program information to derive simultaneously viewable program information in the second embodiment;

FIG. 26 is the simultaneously viewable program information and the own storage program information at Step S410 in the flowchart of Step S302;

FIG. 27 is the simultaneously viewable program information and the own storage program information at Step S420 in the flowchart of Step S302;

FIG. 28 is the simultaneously viewable program information and the own storage program information at Step S430 in the flowchart of Step S302;

FIG. 29A is an example of the data structure for one program to be registered in storage program information, FIG. 29B is an example of the data structure in case of being scheduled for recording, FIG. 29C is an example of the data structure of a state in case of recording finished, FIG. 29D is an example of the data structure of the state in case of recording scheduled for simultaneous viewing, FIG. 29E is an example of the data structure of the state in case of recording completed according to reserve for simultaneously viewing, and FIG. 29F is an example of the data structure of the state after reproduction by simultaneously viewing;

FIG. 31 is a display example of a storage program table;

FIG. 32 is a display example of a dialogue in case of reproducing a storage program scheduled for simultaneously viewing;

FIG. 33 is a flowchart of the simultaneous viewing operation in the case where a program information detection apparatus performs the detection of simultaneously viewable programs;

FIG. 34 is a schematic block diagram of prior art; and

DETAILED DESCRIPTION OF THE PREFERRED EMBODIMENTS

In the following, the attached drawings are referred to while the preferred embodiments of the present invention are described in detail.

Embodiment 1

Figure 1:
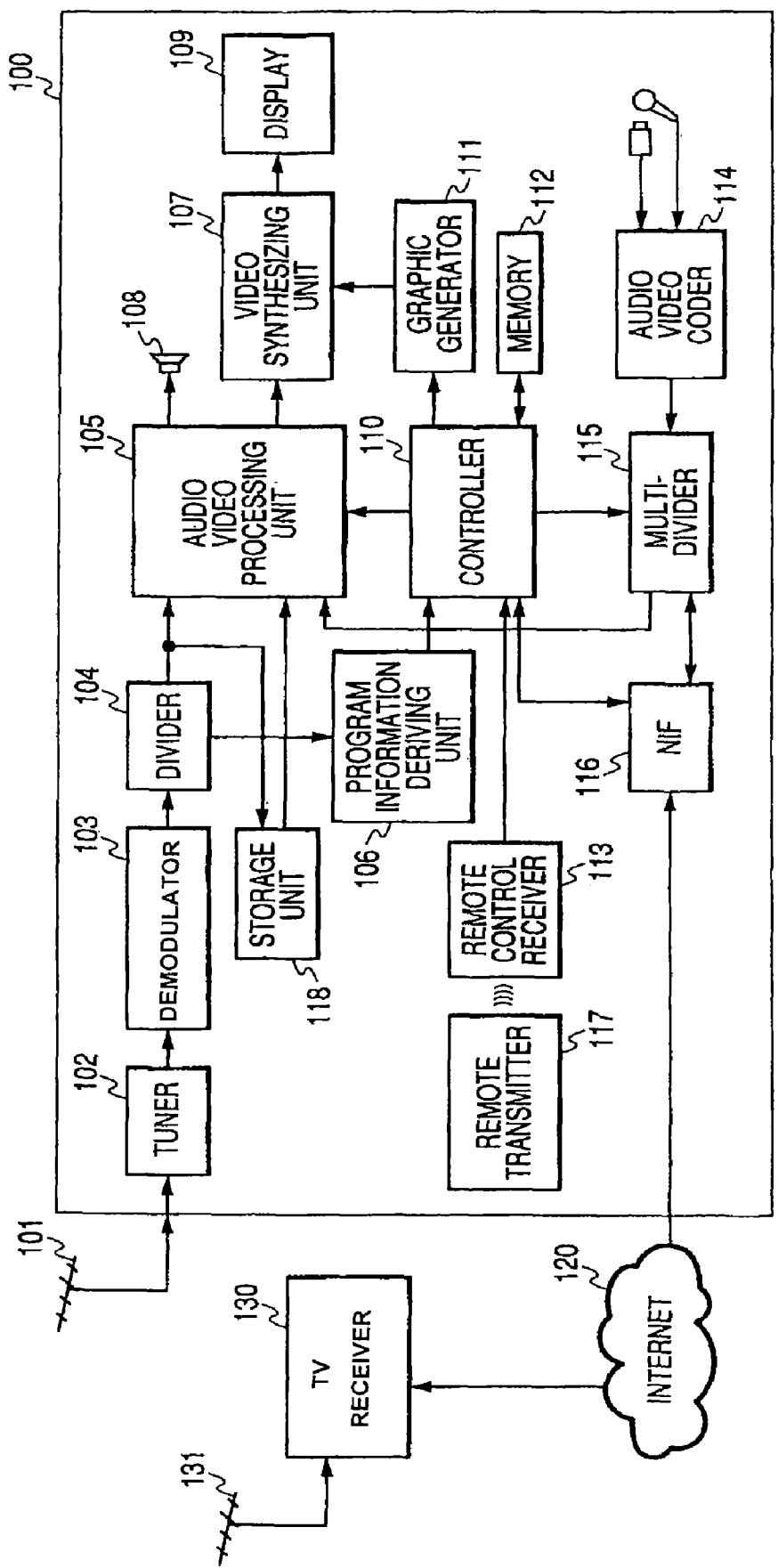
FIG. 1 is a block diagram of the schematic configuration of a first embodiment of the present invention.

FIG. 1 shows a block diagram of the schematic configuration of a digital television receiver 100 as an embodiment of the present invention.

A broadcast signal from a receiving antenna 101 of a ground wave digital broadcast or a cable television (CATV) broadcast signal is input into a tuner 102. The tuner 102 selects (is tuned to) a specified channel from received data including program information, and outputs the selected channel data to a demodulator 103 on the basis of a control signal from a controller 110.

The demodulator 103 performs demodulation processing of input received data according to its broadcast form. For example, when the demodulator 103 demodulates digital data, the demodulator 103 performs error correction after performing digital demodulation processing. The demodulator 103 outputs demodulated data to a divider 104. The divider 104 divides a video signal, an audio signal and a data signal from an output signal of the demodulator 2. The divider 104 outputs the divided video signal and the audio signal to an audio video processing unit 105, and outputs the divided data signal to a program information deriving unit 106.

The audio video processing unit 105 expands (decodes) the video signal compressed by the Moving Picture Expert Group 2 (MPEG 2) system. The decoded video signal is stored in a frame memory of a video synthesizing unit 107, which frame memory has a storage capacity for at least one screen. The decoded audio signal is converted to an analog signal by a not shown digital-to-analog (D/A) converter, and is output from a speaker 108 including an amplifying function as a sound.

The program information driving unit 106 derives program information added at a transmission of a broadcast program from the data signal from the divider 104. In the present embodiment, program property data necessary for program selection is also derived. The program information including the derived property data is supplied to the controller 110. The program property data is the information indicating the property of a program based on a broadcast signal, and is data such as the information of the starting time and ending time of a program, transmission channel information, the title of a program, genre information necessary for classifying a program into genres, the information indicating a broadcast service form such as a pay television, the series information of a program and the information limiting viewable age of a program. In the case where a transmitted broadcast signal is a pay television, there is also a case where accounting information for performing accounting or the like is added to the relevant program.

The controller 110 executes various processing in accordance with a program stored in a nonvolatile memory (read-only memory (ROM)) of a memory 112. The controller 110 may be made of only logical logics, or may be made of a central processing unit (CPU) or a media processor capable of parallel operation.

An infrared signal output from a remote transmitter 117 (the so-called remote control) by the operation of a user is received by a remote control receiver 113, and then the user operation information is supplied to the controller 110.

The controller 110 takes therein program information data output from the program information deriving unit 106, and stores the taken program information data into the memory 112. Because the program information data is transmitted at a fixed period, the memory 112 always holds the newest program information.

A graphic generator 111 expand's data of an electronic program guide (EPG) screen or the like in a frame memory in the screen synthesizing unit 107 by using an acceleration function such as bit block transfer (BitBLt) and direct memory access (DMA) on the basis of a rendering command of the controller 110. The BitBLt means a transfer of bit map data, and the transfer can be executed between the main memory and a graphic memory and between graphic memories.

Character fonts and the like are stored in the memory 112 as the need arises, and the character fonts and the like are used at the time of expanding character information on a screen.

The screen synthesizing unit 107 performs switching of display addresses while the video synthesizing unit 107 reads out display data from its internal memory on the basis of a window management instruction from the controller 110, and suitably synthesizes video data from the audio video processing unit 105 and the image data from the graphic generator 107 to output the data indicating the synthesized screen to a display 109.

Moreover, the screen synthesizing unit 107 sometimes selects one of the video data from the audio video processing unit 105 and image data from the graphic generator 111 to output the selected data to the display 109.

The display 109 is composed of an image display device such as a flat panel including a matrix electrode structure (a liquid crystal display device or a plasma display device) and a cathode ray tube (CRT).

An audio video coder 114 codes the video of a video camera and a sound of a microphone, both connected for the television conversation function, and supplies the coded vide and sound to a multi-divider 115.

The multi-divider 115 multiplexes the coded video data and audio data, and control data from the controller 110 to output the multiplexed data to a network interface (NIF) 116 as stream data. Moreover, the multi-divider 115 divides stream data input from a network 120 through the network interface 116 to video data, audio data and control data. The multi-divider 115 outputs the divided video data and audio data to the audio video processing unit 105, and outputs the divided control data to the controller 110.

The audio video processing unit 105 decodes audio data to mix the decoded audio data with the audio of a broadcast program at an appropriate mixing ratio. The audio output of the audio video processing unit 105 is applied to the speaker 108. The audio video processing unit 105 also decodes video data, and the decoded video data is displayed as a partner image in a television conversation function at a part of the display 109 by the screen synthesizing unit 107.

The network interface 116 is connected with a television receiver 130 as the partner of a television conversation through the network 120. The network interface 116 transmits and receives the multiplexed stream data of the television conversation with the television receiver 130, and exchange the severally received data such as program information with the television receiver 130, as will be described later. By means of the network interface 116, the television receiver 100 can access the service of the Internet by being connected to a not shown web site on the Internet to download a web page described by Hyper Text Markup Language (HTML) or the like.

A storage unit 118 is made of, for example, a hard disc (HDD). The storage unit 118 can store the transport stream (TS) data divided by the divider 104, and can record a broadcast program. By reading out the TS data stored in the storage unit 118 and by decoding the read TS data by the audio video processing unit 105, the digital television receiver 100 can reproduce the recorded broadcast program. Moreover, by the mixed operation of storing and reading, the functions of delayed reproduction, digest reproduction, time shifting and the like can be realized. The controller 110 controls these functions to the storage unit 118.

Figure 2:
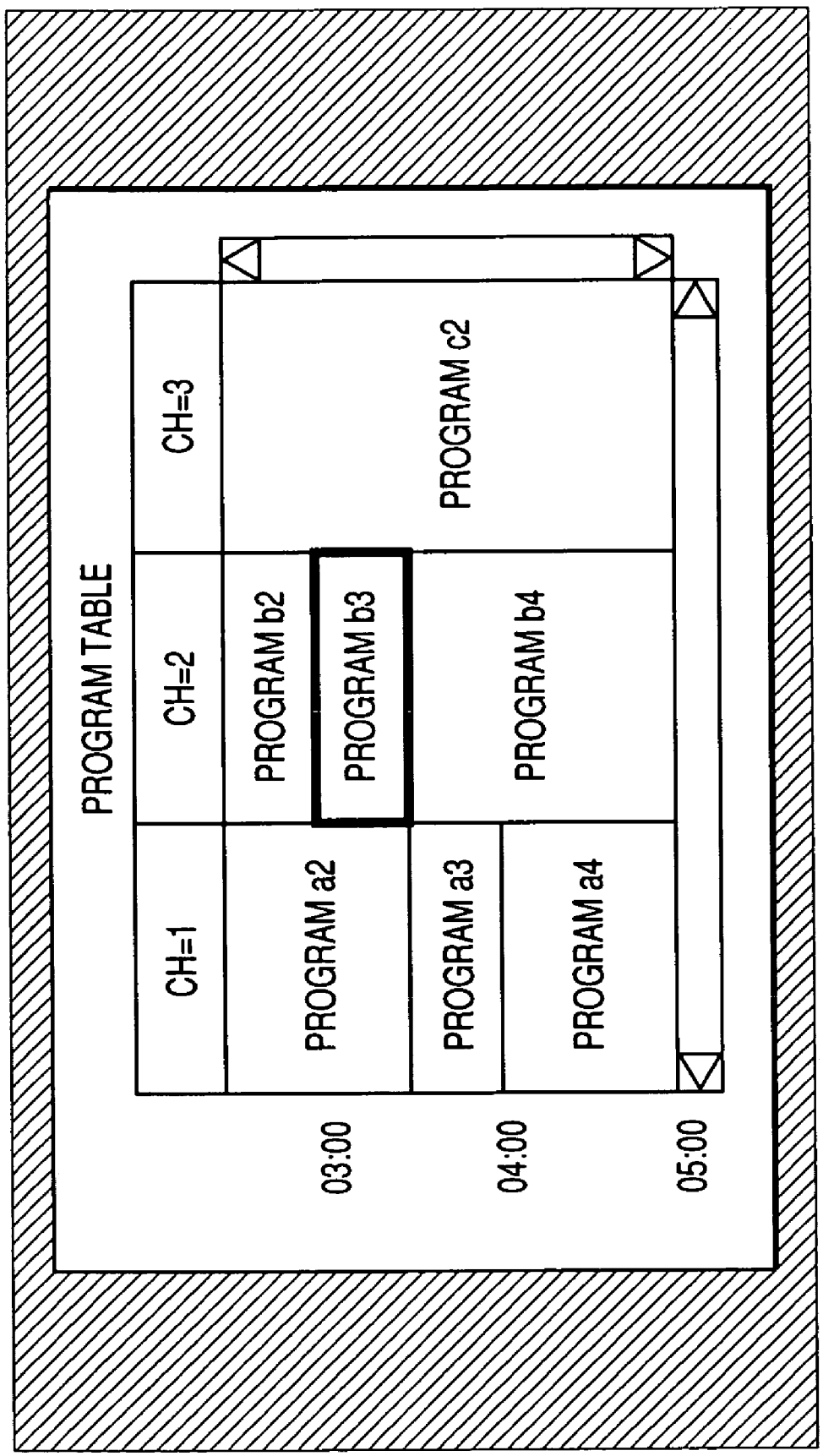
FIG. 2 is an example of a program table displayed by a digital television receiver 100.

FIG. 2 shows an example of a program table displayed by the digital television receiver 100. This is the so-called electronic program guide (EPG) screen. The digital television receiver 100 displays a program broadcast schedule as shown in FIG. 2 on the basis of the program information stored in the memory 112. Thereby, the operation of a viewer for channel selection, reservation of viewing and reservation of recording is aided. The program table shown in FIG. 2 is made to be in a table form arranging time in the ordinate axis thereof and broadcasting stations and their channels in the abscissa axis thereof. The information pertaining to the contents of a program which can be viewed at each time in each channel as well as the program title and the genre of the program are displayed. And by selecting a specific program at the present time to perform channel tuning on the basis of the stored program information, it is possible to start to view an aimed program. That is to say, by performing selection operation by moving a selection candidate display displayed on the program table by means of the operation of a direction key of a remote control 117, a desired program can be selected for channel tuning. Moreover, by selecting a program at a future time on the program table, viewing reservation or recording reservation can be performed.

The television receiver 130 is provided with a configuration and functions similar to those of the television receiver 100, and can receive television broadcasting waves. The television receiver 130 also can be connected to the network 120 to perform a television conversation between the television receiver 100. The television receivers 100 and 130 operate similarly for simultaneous viewing, which will be described in the following.

The characteristic operation of the present embodiment is described. The digital television receiver 100 is connected to the digital television receiver 130, which has been set previously by an appropriate method to be a communication partner of the television conversation function, through the network 120. And, users perform communications by means of video and audio while viewing a common television broadcast program to own the experience. Here, the viewing of the same program with communications like this is referred to as the simultaneous viewing.

FIG. 3 shows an operation flow pertaining to the simultaneous viewing by the digital television receivers 100 and 130. In the following descriptions, one of the two television receivers enabling the simultaneous viewing is referred to as an own television, and the other of them is referred to as a partner television. Moreover, the program information which can be received by the own television is referred to as own program information, and the program information which can be received by the partner television is referred to as partner's program information. The digital television receiver 100 is regarded as the own television, and the television receiver 130 is regarded as the partner television. The controller 110 of the own television controls each unit in accordance with logics incorporated in itself or the programs stored in the memory 112.

At Step S101, the controller 110 derives the program information included in a broadcasting wave with the program information deriving unit 106, and stores the derived program information in the memory 112 as own program information. Next, the own television requests of the previously set partner television the program information which the partner television derived from a broadcasting wave and stored through the network interface 115 (Step C101), and receives the program information (Step C102). The controller 110 stores the received program information in the memory 112 as partner's program information. FIG. 4A shows an example of the own program information, and FIG. 4B shows an example of the partner's program information.

The controller 110 requests stored program information stored by the partner television to the partner television (Step C 103), and receives the stored program information (Step C 104) to store the received program information in the memory 112 as the partner-stored program information. The stored program information is the information for specifying the program stored or scheduled to be stored in future in the storage unit 118 (recording reserved program by reserving record function). In the own television, the controller 110 registers the partner-stored program information in the stored program information on the basis of the program information at the time of storing (recording) a received broadcast program in the storage unit 118, and deletes the information of the program from the stored program information at the time of deleting the stored program. Here, the stored program information which the controller 110 stores in the memory 112 at the time of the storing control of the own television is referred to as own storage program information, and the storage program information which has been received from the partner television and has been stored in the memory 112 is called partner's storage program information.

The controller 110 uses the own program information and the partner's program information which are stored in the memory 112 to derive a program for which the own television and the partner television can own viewing experience in common, and produces simultaneously viewable program information (Step S102). The details of the process (Step S102) are shown in FIG. 5.

Figure 5:
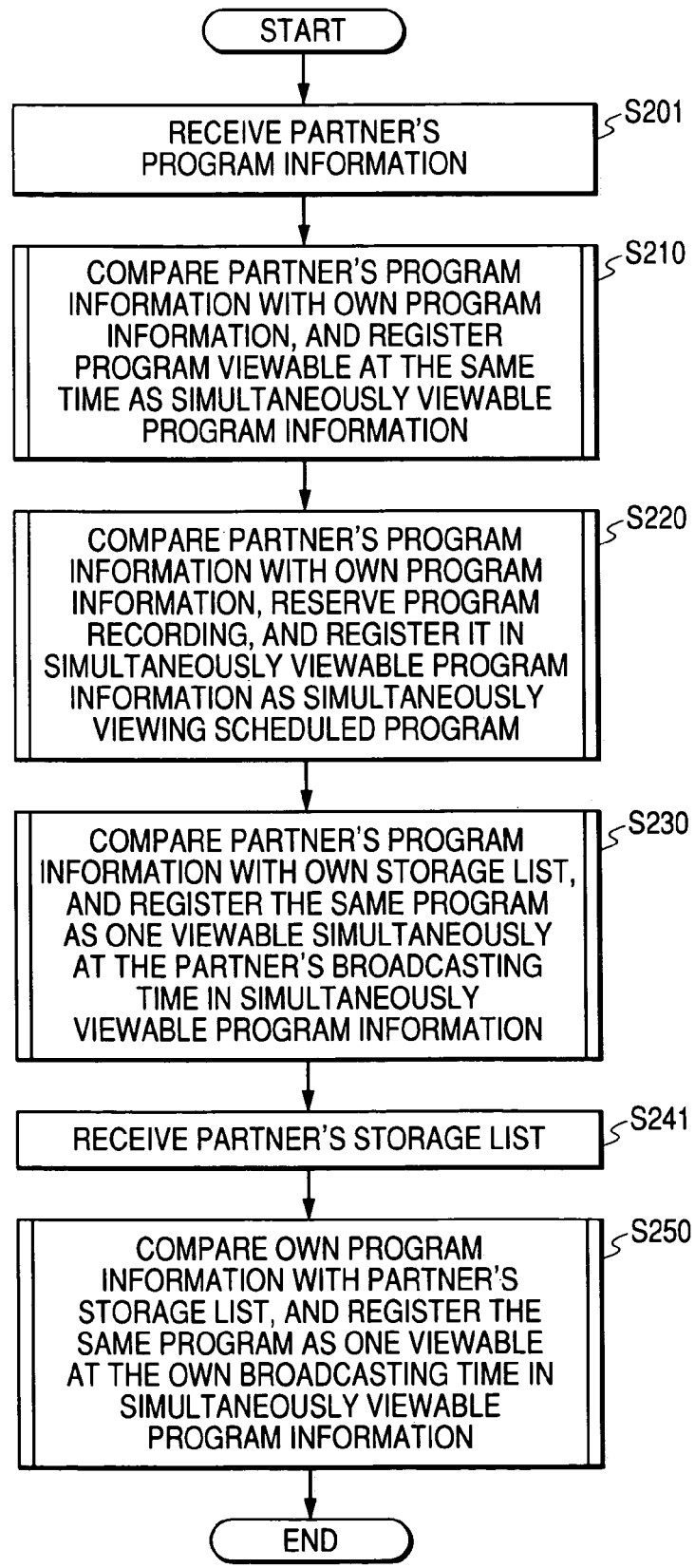
FIG. 5 is a detailed flowchart of Step S102 in the flow of the simultaneous viewing operation of the first embodiment of the present invention.
Figure 6:
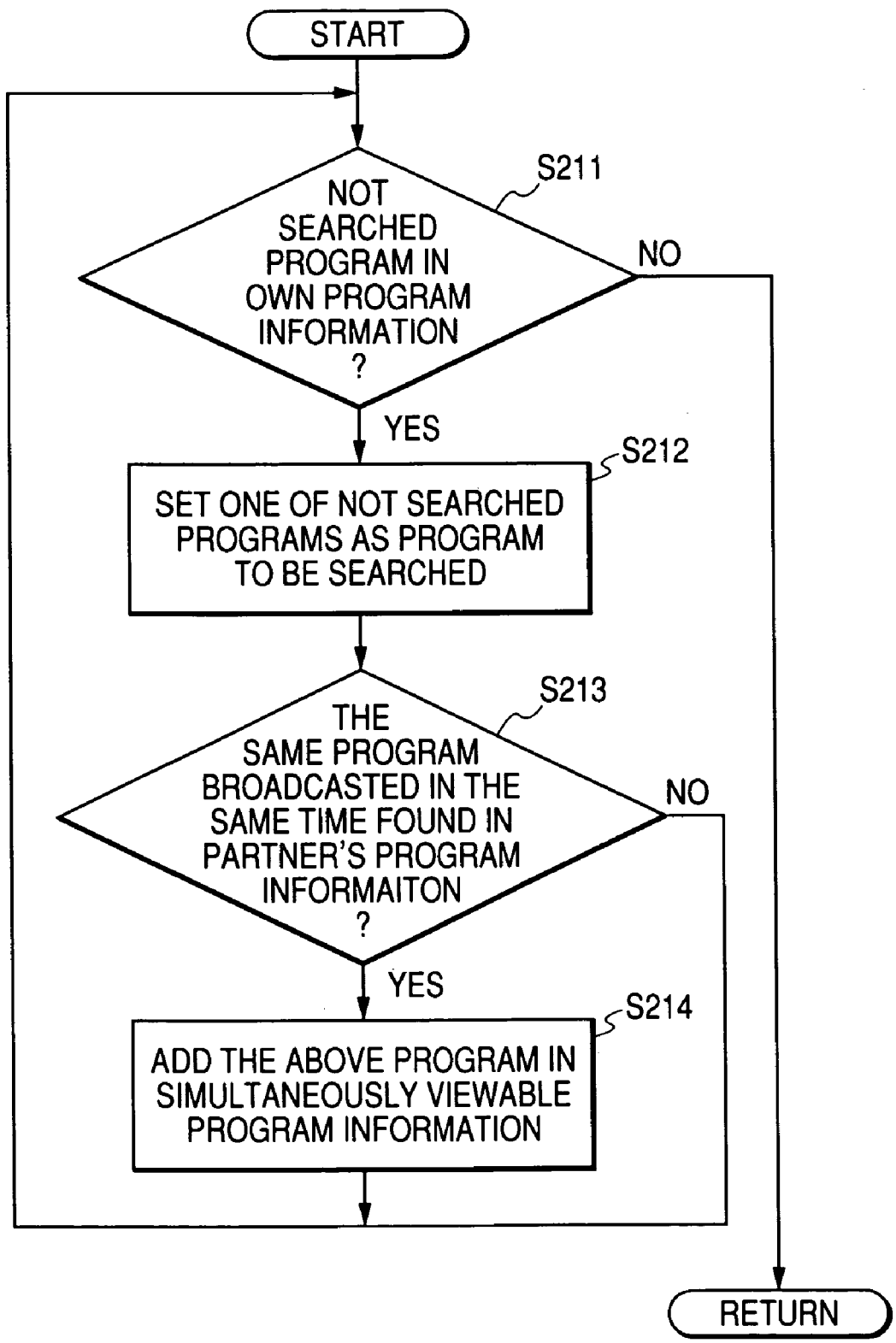
FIG. 6 is a detailed flowchart of Step S210 in the flowchart of Step S102.

At a first step of FIG. 5, after the controller 110 has received the partner's program information (Step S201), the controller 110 compares the own program information with the partner's program information, and derives programs which will be broadcast at the same time by the own television and by the partner television to store the derived programs in the memory 112 as the simultaneously viewable program information (Step S210). The details of Step S210 are shown in FIG. 6.

Figure 7:
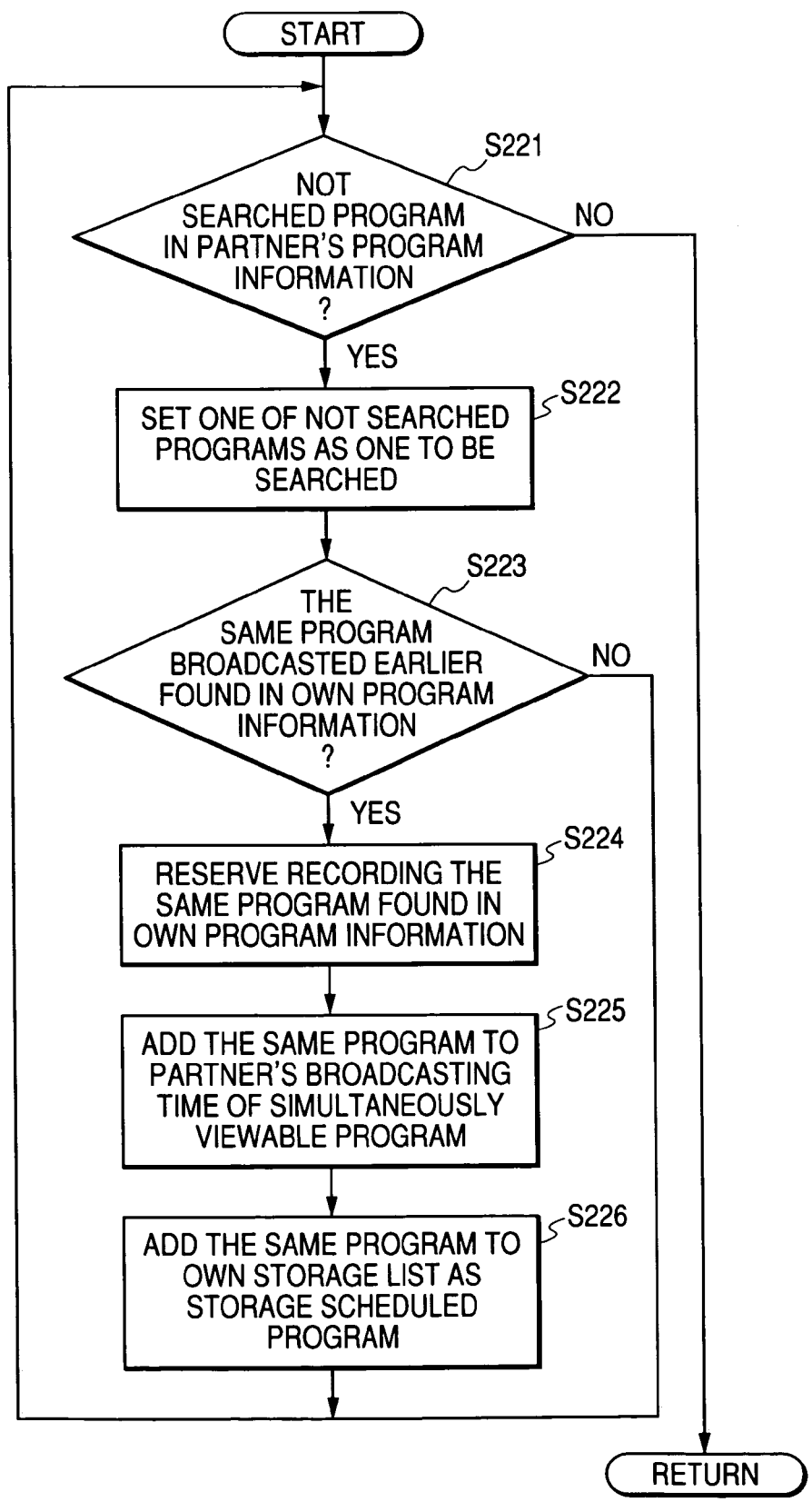
FIG. 7 is a detailed flowchart of Step S220 in the flowchart of Step S102.

At a second step of FIG. 5, the own program information and the partner's program information are compared. Thereby, a program which is the same one to the own television and to the partner television and has a broadcast time earlier in the own program information than in the partner's program information is derived. Then, the derived program is stored in the storage unit 118 by the reserve recording function. Consequently, the stored program is registered in the storage program information stored in the memory 112 as the storage scheduled program. At the same time, the program is registered in the simultaneously viewable program information as the simultaneously viewable program at the broadcast time thereof on the partner's program information (Step S220). The details of the operation are shown in FIG. 7.

Figure 8:
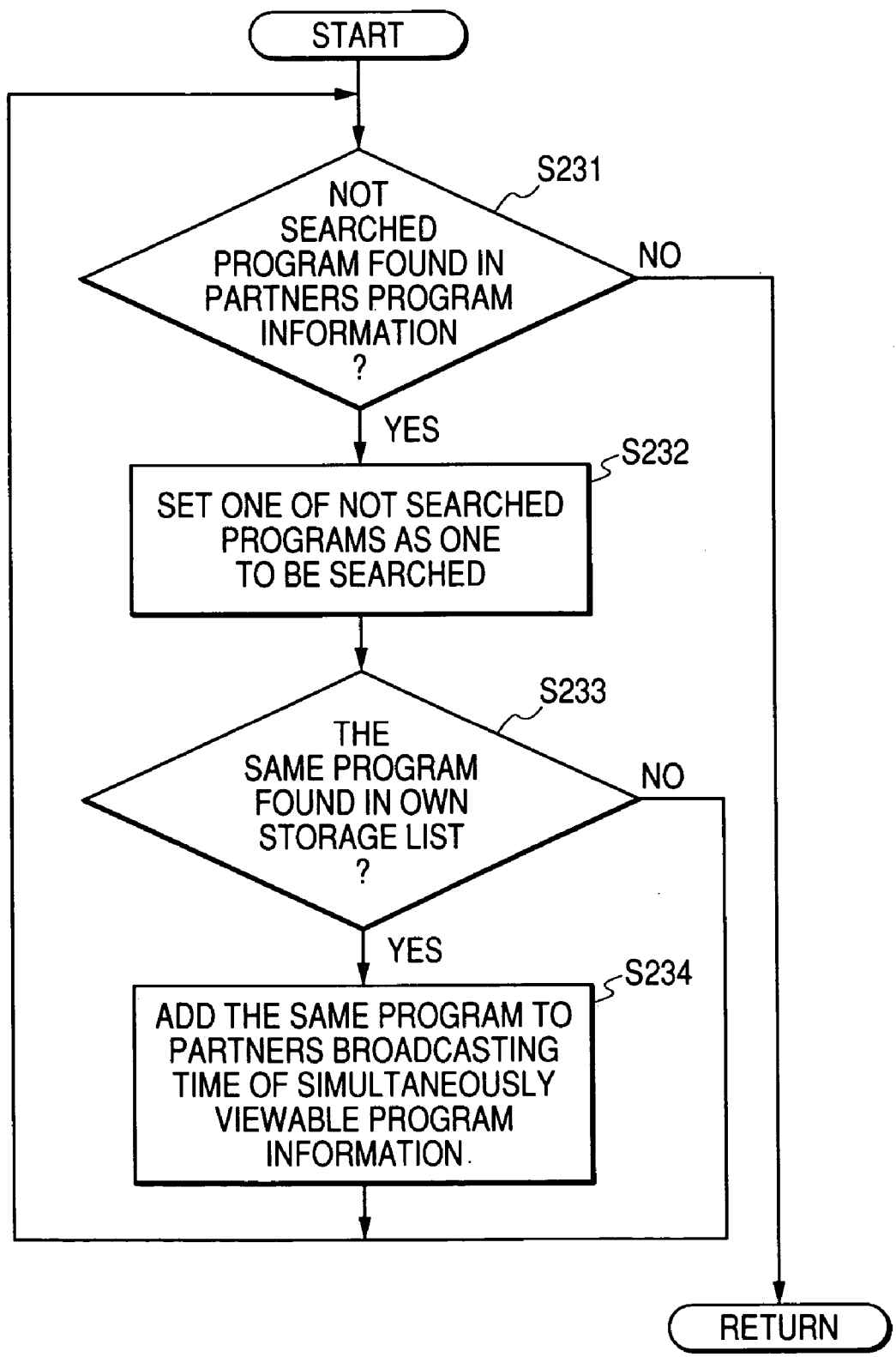
FIG. 8 is a detailed flowchart of Step S230 in the flowchart of Step S102.

At a third step of FIG. 5, the controller 110 of the own television compares the partner's program information with the own storage program information to derive the same program as the program which has already been stored in the own television from the partner's program information. Then, the controller 110 registers the derived program in the simultaneously viewable program information as a simultaneously viewable program at the broadcast time in the partner's program information (Step S230). FIG. 8 is a detailed flowchart of Step S230.

Figure 9:
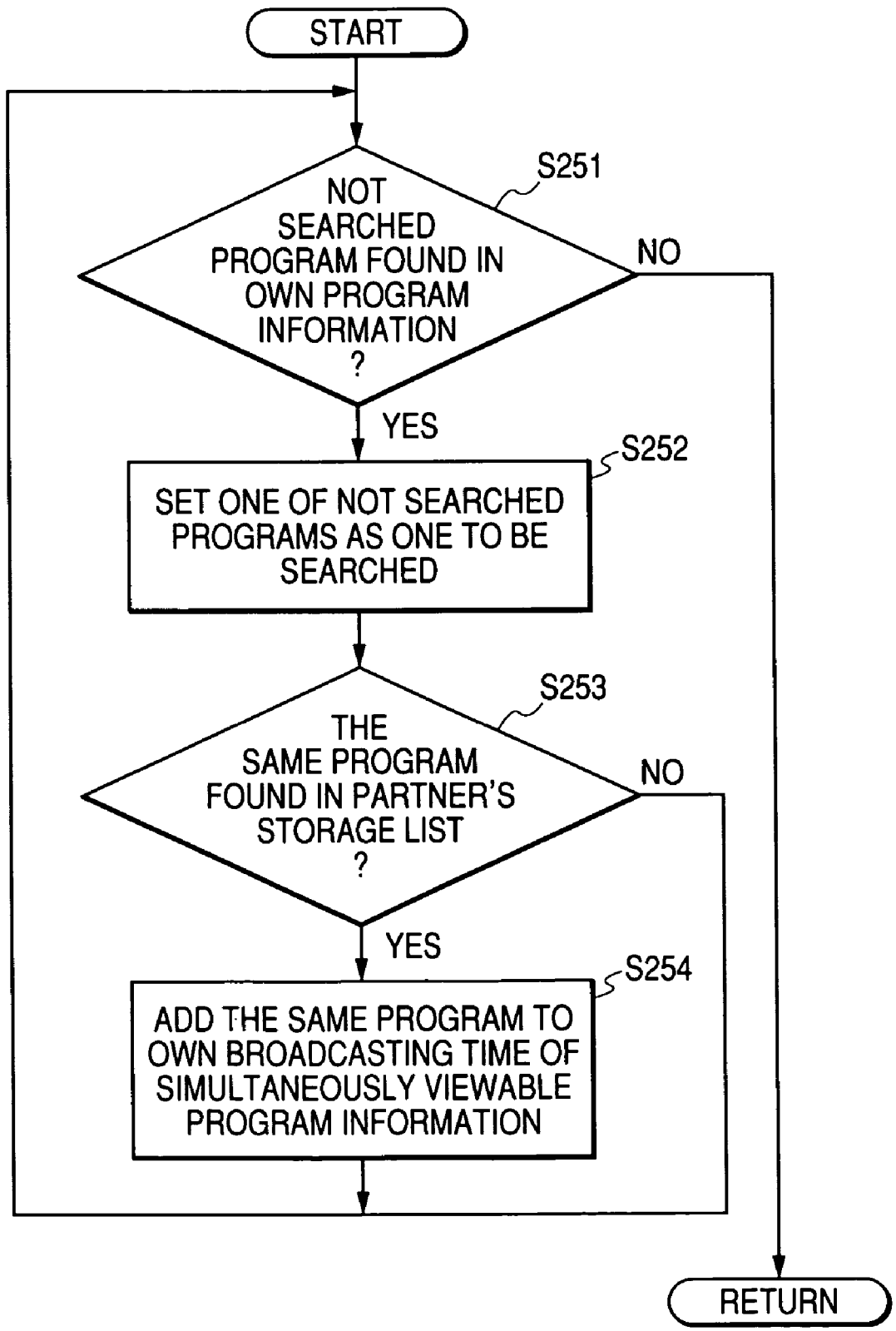
FIG. 9 is a detailed flowchart of Step S250 in the flowchart of Step S102.

Next, the controller 110 requests the storage program information stored by the partner television from the partner television (Step C 103) through the network, and receives the storage program information (Step C104, Step S240) to store the received storage program information in the memory 112 as the partner's storage program information. The controller 110 compares the obtained partner's storage program information with the own program information, and derives the same program to register the derived program in the simultaneously viewable program information as a simultaneously viewable program at the broadcast time in the own program information (Step S250). The detailed flow of the operation pertaining to the comparison and the deriving is shown in FIG. 9.

Examples of the simultaneously viewable program information and storage program information of the own television, which are produced by the processes described above, and the partner's storage program information from the partner television are shown in FIGS. 10 to 14.

Figure 10:
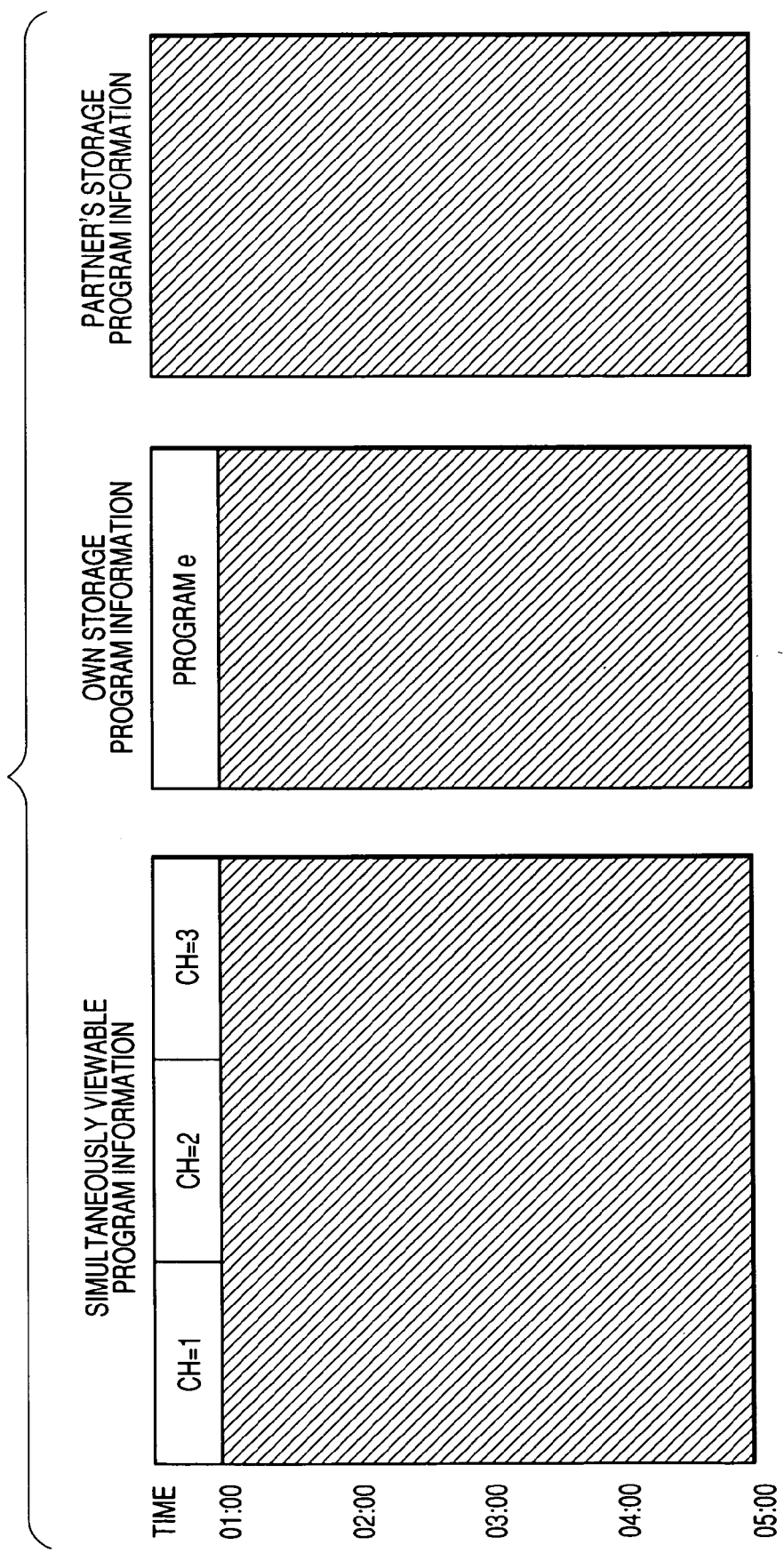
FIG. 10 is examples of simultaneously viewable program information of an own television, own storage program information and partner's storage program information before receiving partner's program information to derive simultaneously viewable programs in the first embodiment.

FIG. 10 shows the simultaneously viewable program information and the own storage program information of the own television before the reception of the partner's program information and the derivation of the simultaneously viewable program, and the partner's storage program information. The own storage program information shows that a program e is stored (recorded) in the storage unit 117 by the operation before this description. Because the storage program information of the partner television has not been received yet at this time point, the partner's storage program information of the memory 116 is vacant.

Figure 11:
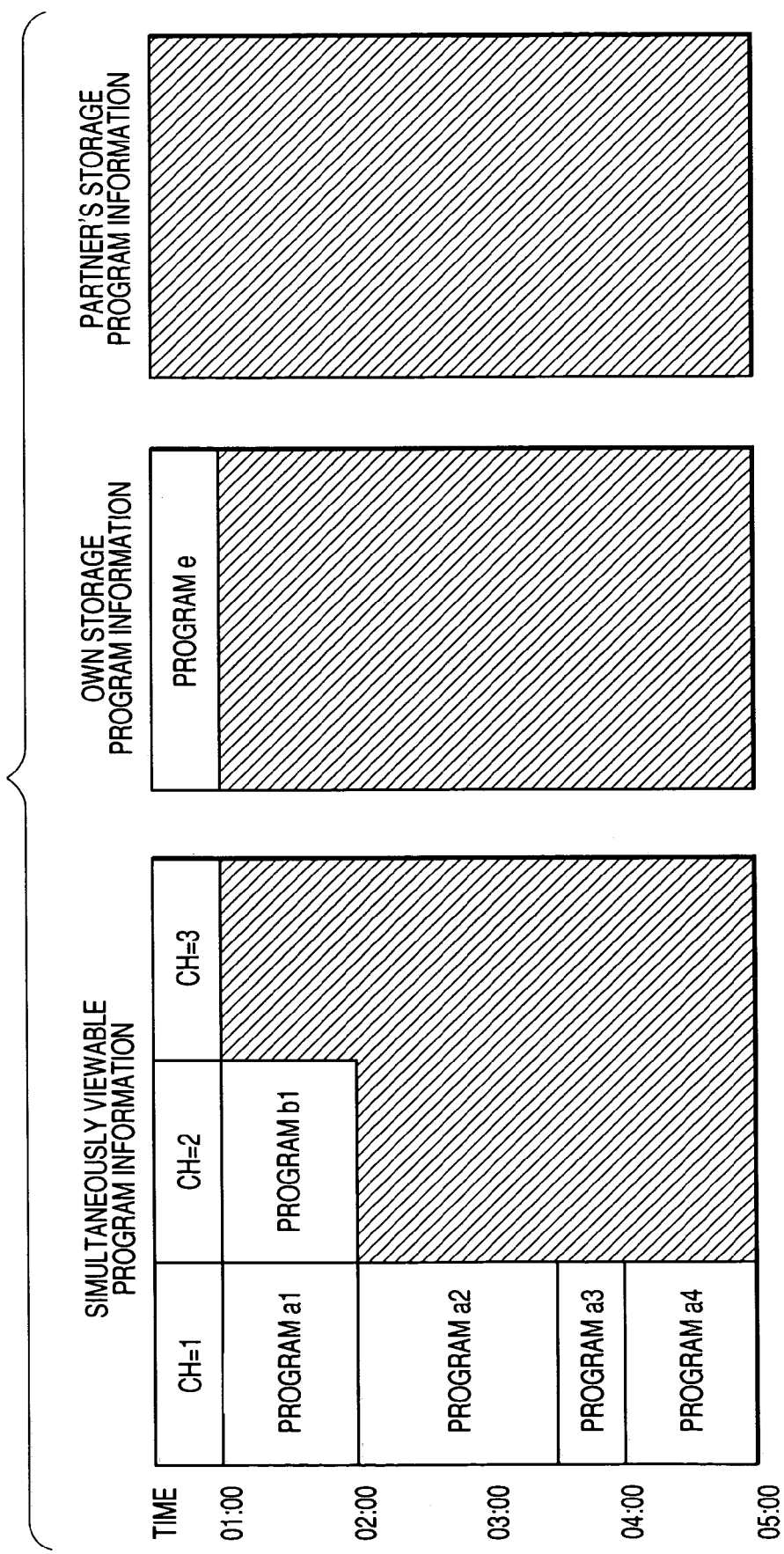
FIG. 11 is examples of simultaneously viewable program information, storage program information and partner's storage program information at Step S210 in the flowchart of Step S102.

FIG. 11 shows the simultaneously viewable program information and the own storage program information of the own television, and the partner's storage program information at the time point when the partner's program information is compared with the own program information to register the simultaneously viewable program (Step S210) after the reception of the partner's program information. Programs a1, a2, a3 and a4 of channel 1 and a program b1 of channel 2 are registered as the programs viewable at the same time by the two televisions (simultaneously viewable programs) in the own program information shown in FIG. 4A and the partner's program information shown in FIG. 4B.

Figure 12:
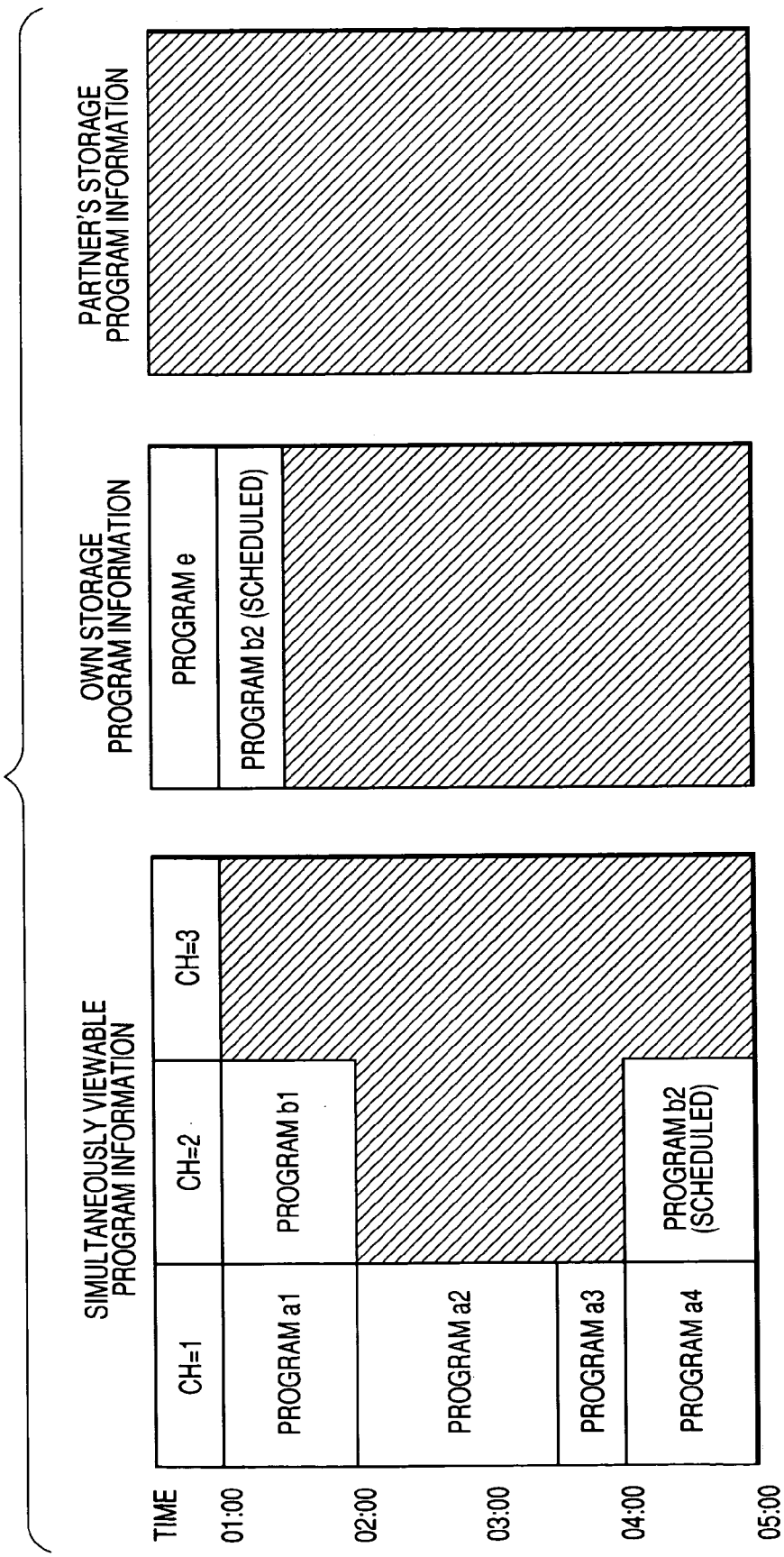
FIG. 12 is examples of simultaneously viewable program information, storage program information and partner's storage program information at Step S220 in the flowchart of Step S102.

FIG. 12 shows the simultaneously viewable program information and the own storage program information of the own television, and the partner's storage program information at the time point of detecting a program which is common in the own program information and the partner's program information and has a broadcast time earlier in the own program information than in the partner's program information (Step S220). The program b2 to be broadcast in channel 2 is previously stored at the time of the reception thereof by the own television, and the stored program is reproduced at the time when the partner television can receive the same program. Thereby, the simultaneous viewing can be performed. Consequently, as the simultaneously viewable program information, the program b2 is registered at the broadcast time in the partner's program information as the simultaneously viewable program information, and the program b2 is registered at the broadcast time in the own program information as storage scheduled in the own storage program information.

Figure 13:
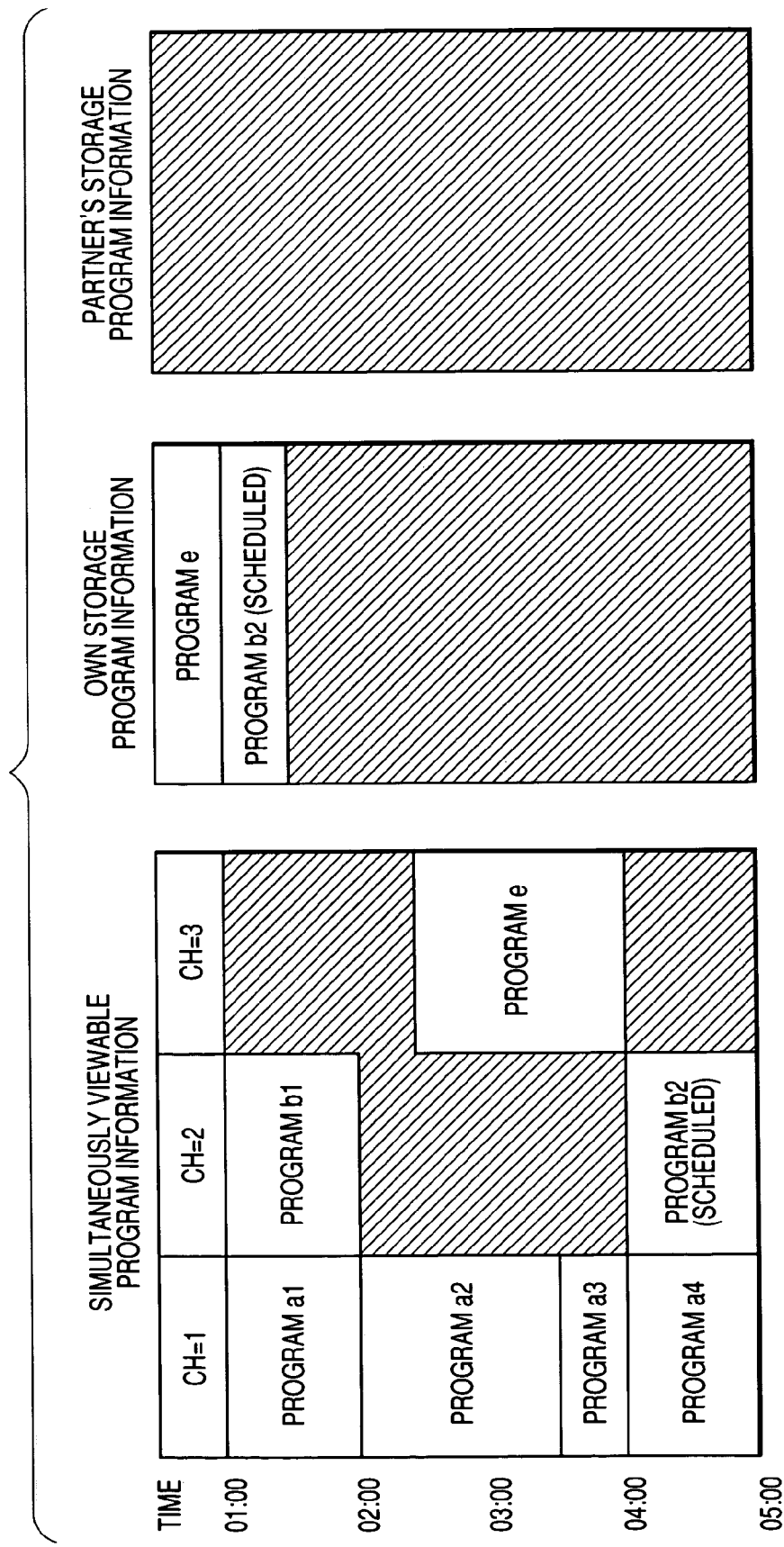
FIG. 13 is examples of simultaneously viewable program information, storage program information and partner's storage program information at Step S230 in the flowchart of Step S102.

FIG. 13 shows the simultaneously viewable program information and own storage program information of the own television, and the partner's storage program information at the time of detecting the simultaneously viewable program by comparing the partner's program information and the own storage program information (Step S230). The simultaneous viewing can be performed by reproducing the program e, which has been stored already in the own television, by the own television at the time when the partner television can receive the same program e. Consequently, the program e is registered in the simultaneously viewable program information as a simultaneously viewable program at the broadcast time in the partner's program information.

Figure 14:
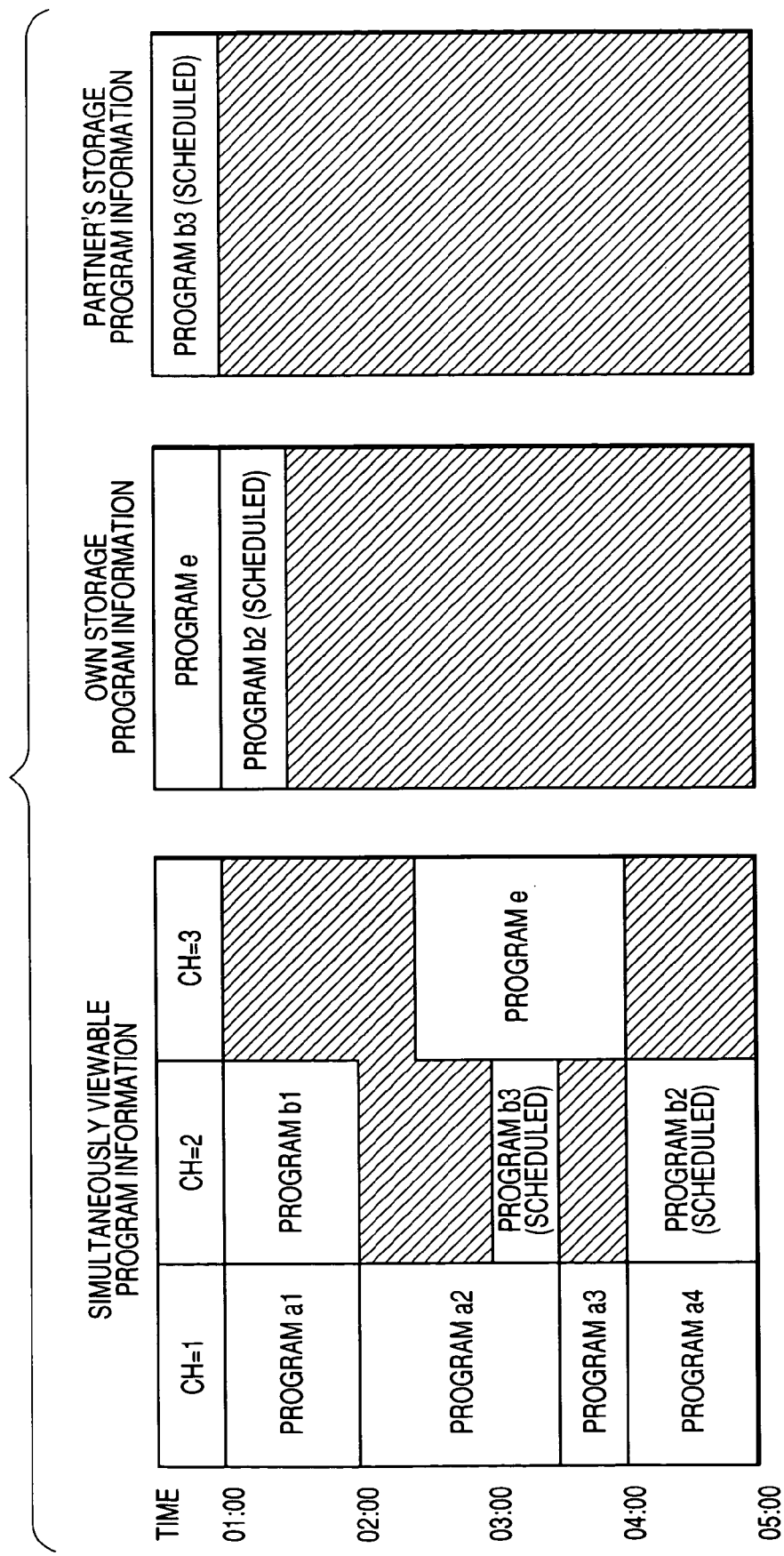
FIG. 14 is examples of simultaneously viewable program information, storage program information and partner's storage program information at Step S250 in the flowchart of Step S102.

FIG. 14 shows the simultaneously viewable program information and own storage program information of the own television, and the partner's storage program information at the time point of receiving the partner's storage program information to compare the received partner's program information with the own program information (Step S250). Because in the received partner's storage program information a program b3 is scheduled to be stored at a time earlier than the broadcast time of the program b3 in the own program information, the simultaneous viewing can be performed by reproducing the stored program b3 by the partner television in parallel with the reception of the broadcast program by the own television at the broadcast time in the own program information. Accordingly, the program b3 is registered as a simultaneously viewable program at the broadcast time in the own program information.

FIG. 15A shows the configuration of data for one program to be registered in the simultaneously viewable program information. As shown in FIG. 15A, the simultaneously viewable program data is composed of the channel, the start date time, the end date time, the program title, the program designation information in the own program information, and the program designation information in the partner's program information of the simultaneously viewable program. The channel, the start date time and the end date time are collectively referred to as a simultaneous viewing position. FIG. 15B shows the program designation information in case of the simultaneous viewing, FIG. 15C shows the program designation information in case of being scheduled for recording, and FIG. 15D shows the program designation information in case of recording finished.

As shown in FIGS. 15A, 15B and 15C, the program designation information in the own program information and in the partner's program information is composed of a selected broadcasting station, a selected channel, a broadcast start date time, a broadcast end date time and state data. The state data is composed of "receiving broadcasting" property in case of receiving a broadcast at the time of simultaneous viewing, of "scheduled for receiving" property in case of being scheduled for performing the storage before the simultaneous viewing, and of "recording finished" property and the information designating a program stored in the storage unit in case of storage finished.

FIG. 16A shows the data structure for one program to be registered in the storage program information. As shown in FIG. 16A, the storage program data is composed of a program title, a selected broadcasting station, a selected channel, a broadcast start date time, a end date time and state data. The state data is composed of "recording scheduled" property in the case where the program is scheduled to be stored in future, and of "recording finished" property and the information designating a program stored in the storage unit in the case where the program has been stored already, as shown in FIGS. 16B and 16C, respectively.

In FIG. 3, when the simultaneous viewing program information and the storage program information have been produced, the controller 110 waits that the simultaneous viewing service is started by the user. During the waiting, when a request of the program information (Step C105) or a request of the storage program information (Step C107) is transmitted from the partner television, the controller 110 takes out the own program information or the own storage program information, which are stored in the memory 117, and transmits the taken out information to the partner television through the network interface 116 (Steps C106 and C108).

When the program storage scheduled time included in the own storage program information has arrived, the controller 110 receives the broadcast designated by the selected channel of the own storage program information, and stores the corresponding broadcast in the storage unit 118. Then, the controller 110 updates the state part of the program data in the simultaneously viewable program information and the own storage program information to be the recording finished property, and stores the link to the program data stored in the storage unit 118 as the content designating information (Step S105).

The user operates the television receiver 100 with the remote control 117, and thereby displays the simultaneously viewable program table based on the simultaneously viewable program information on the display 109 to make it possible to confirm the contents of the table. That is to say, when the user instructs the display of the simultaneously viewable program table by operating an appropriate menu or the like through the remote control, the controller 110 reads the simultaneously viewable program information from the memory 112, and controls the graphic generator 111 to produce a display screen of the program table. The screen of the program table is displayed on the display 109 through the synthesizing unit 107.

Figure 17:
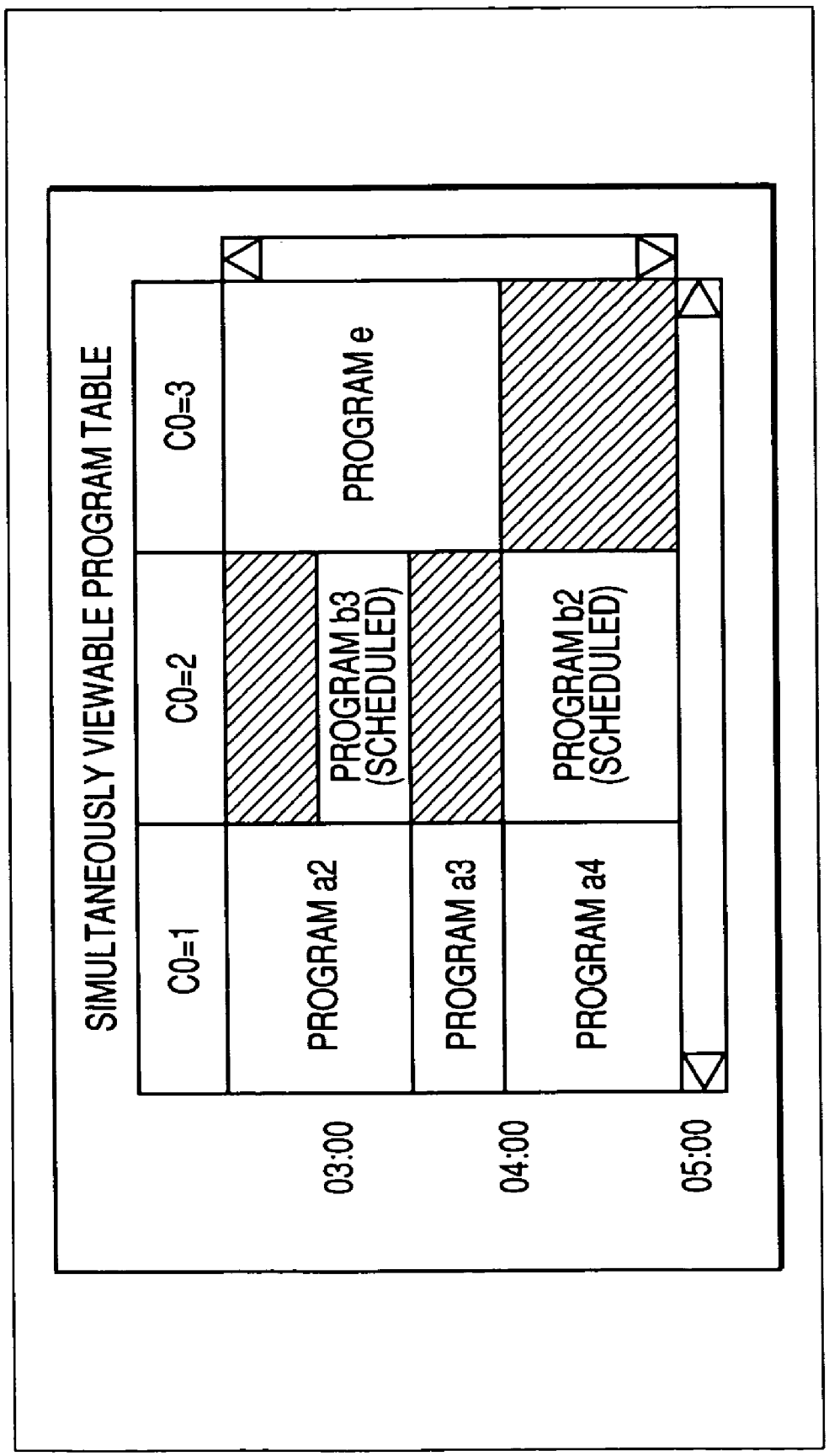
FIG. 17 is a display example of a simultaneously viewable program table of the first embodiment of the present invention.

FIG. 17 shows a display example of the simultaneously viewable program table. The example shown in FIG. 17 is based on the simultaneously viewable program table shown in FIG. 14, and the programs simultaneously viewable during about 3:00 to 7:00 are displayed. The user looks this table to know that it is possible to watch a plurality of television programs together with the user of the partner television in this time zone.

In FIG. 3, when the user instructs the start of the simultaneous viewing with the partner television by an appropriate menu operation through the remote control or the like, the controller 110 establishes a television conversation connection with the partner television 130 through the network interface 116 (Step C109), and starts to exchange (transmit and receive) mutual audio video streams (Step C110).

For example, when the user has selected the program a2 in the simultaneously viewable program table displayed on the display 109 through a remote control operation a little before about 3:00 (Step S105), the controller 110 detects the operation, and cooperatively controls the tuner 102, the demodulator 103, the divider 104 and the audio video processing unit 105 on the basis of the own program designating information of the data related to the program in the simultaneously viewable program information. And then, the controller 110 selects the channel 1 to display the program a2. At the same time, the controller 110 transmits a channel tuning request to the partner television through the network interface 116 for selecting the same channel 1 on the basis of the partner's program designating information of the data related to the program in the simultaneously viewable program information (Step C11).

For example, when the user selected the program b3 in the simultaneously viewable program table about at a time after 3:00, the controller 110 controls the own television to select the channel 2 on the basis of the own program designating information of the data related to the program in the simultaneously viewable program information, and transmits a request of channel tuning in order to reproduce the program b3 in the stored program to the partner television on the basis of the partner's program designating information of the same data. When one of the own television and the partner television performs the reception of a broadcast program and the other of them performs reproduction of a storage program for simultaneous viewing, the controller 110 controls the own television or requests the partner television from the own television in order to reproduce from an intermediate position of the storage program for performing the reproduction at the time point according to the advance of the broadcasting program on the basis of the time at the time point of performing the request.

For example, when the user selected the program b2 in the simultaneously viewable program table about at a time after 4:00, the controller 110 controls the own television to reproduce the channel 2 of the storage program on the basis of the own program designating information of the data related to the program in the simultaneously viewable program information, and transmits a request of channel tuning in order to select the channel 3 to the partner television on the basis of the partner's program designating information of the same data.

In the case where the user of the partner television has selected a program in the simultaneously viewable program table displayed on the partner television, a channel tuning request similar to that from the own television is transmitted from the partner television (Step C112). The controller 110, which has received the channel tuning request through the network interface 116, cooperatively controls the tuner 102, the demodulator 103, the divider 104 and the audio video processing unit 105 on the basis of the channel designation in accordance with the contents of the request to select the designated channel for displaying it. Alternatively, the controller 110 reproduces the designated stored program.

Figure 18:
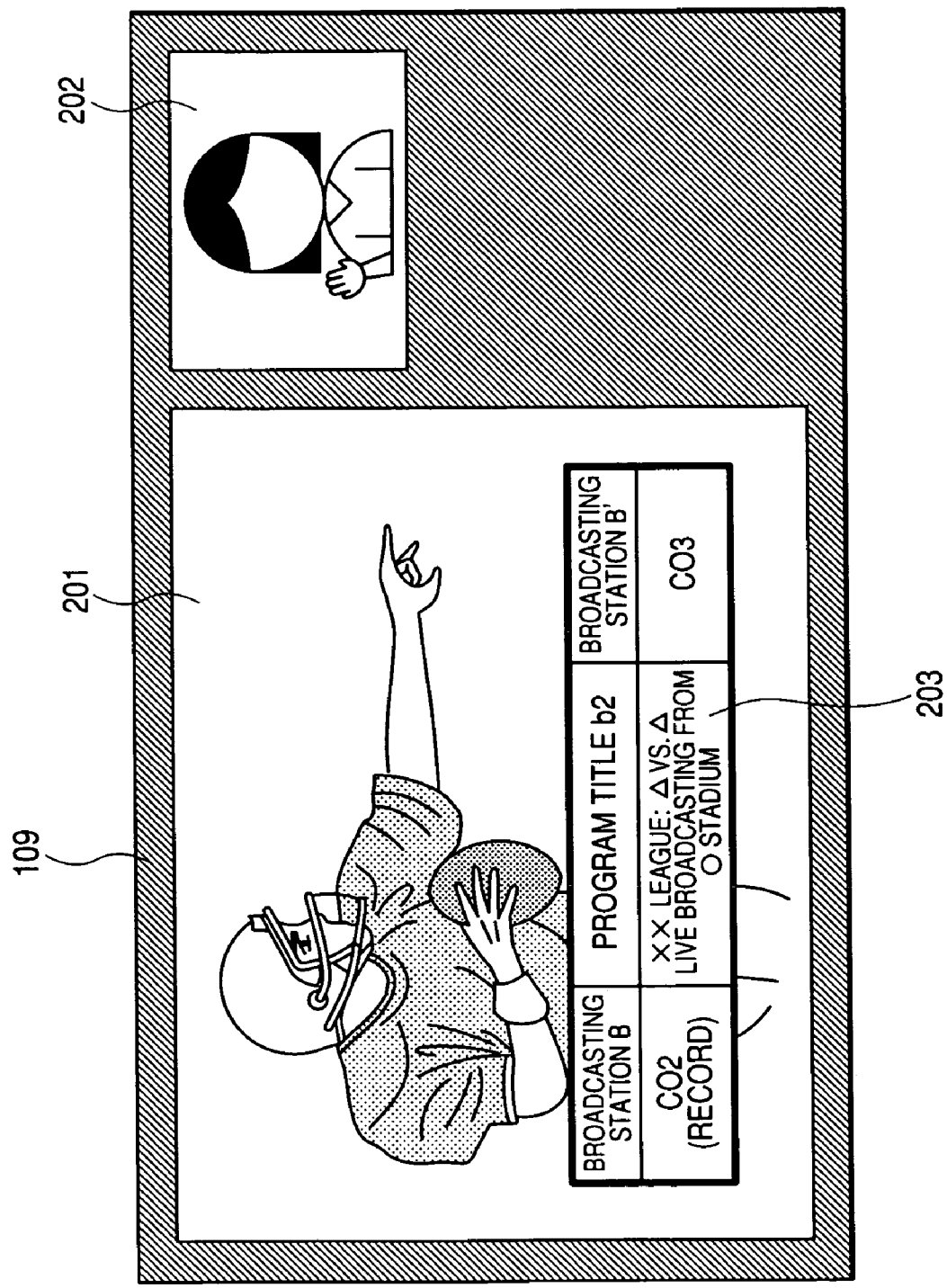
FIG. 18 is an example of a display screen at the time of viewing the same program.

FIG. 18 shows a display screen example of the display 109 of the own television for viewing the same broadcast program while performing a communication accompanied by audio and video with a partner television by means of the television conversation function in such a way. In FIG. 18, a reference numeral 201 denotes a picture viewing simultaneously with the partner television. A reference numeral 202 denotes the video of the user of the partner television photographed by the television camera equipped in the partner television. A reference numeral 203 denotes a program information display displaying the program title of the program to be viewed simultaneously, the description of the program, the broadcasting station performing the broadcast of the program, and the channel of the program. In the program information display 203, the broadcasting station from which the program has been received by the own television and the channel of the broadcasting station, and the broadcasting station from which the program has been received by the partner television and the channel of the broadcasting station are displayed. The program information display 203 is chiefly displayed when a tuning operation or a channel tuning based on a channel tuning request is performed, and will be erased after a suitable time.

In the present embodiment, the own program information and the partner program information are compared with each other, and a program having an earlier broadcast time in the own program information in comparison with the broadcast time in the partner's program information is detected. Then the schedule of storage of the program is registered, and at the same time the program is registered also in the simultaneously viewable program information as a simultaneously viewable program. However, the program may be registered in the simultaneously viewable program information after the storage (recording) of the program has been completed actually.

A scheduled time zone in which simultaneous viewing is performed may be previously designated by an appropriate operation method, and only the programs which can be simultaneously viewed in that time zone may be detected. In this case, because the number of the programs which are previously stored for simultaneous viewing is limited, there is an advantage that the capacity of the storage unit 117 can be relatively reduced.

Embodiment 2

A second embodiment of the present invention has a feature in storage control for enabling the simultaneous viewing of the same program to be broadcast at different times by two television receivers for performing the simultaneous viewing. The second embodiment will be described with priority given to different points from the first embodiment, and the descriptions concerning the similar function portions as those of the first embodiment will be omitted.

Figure 19:
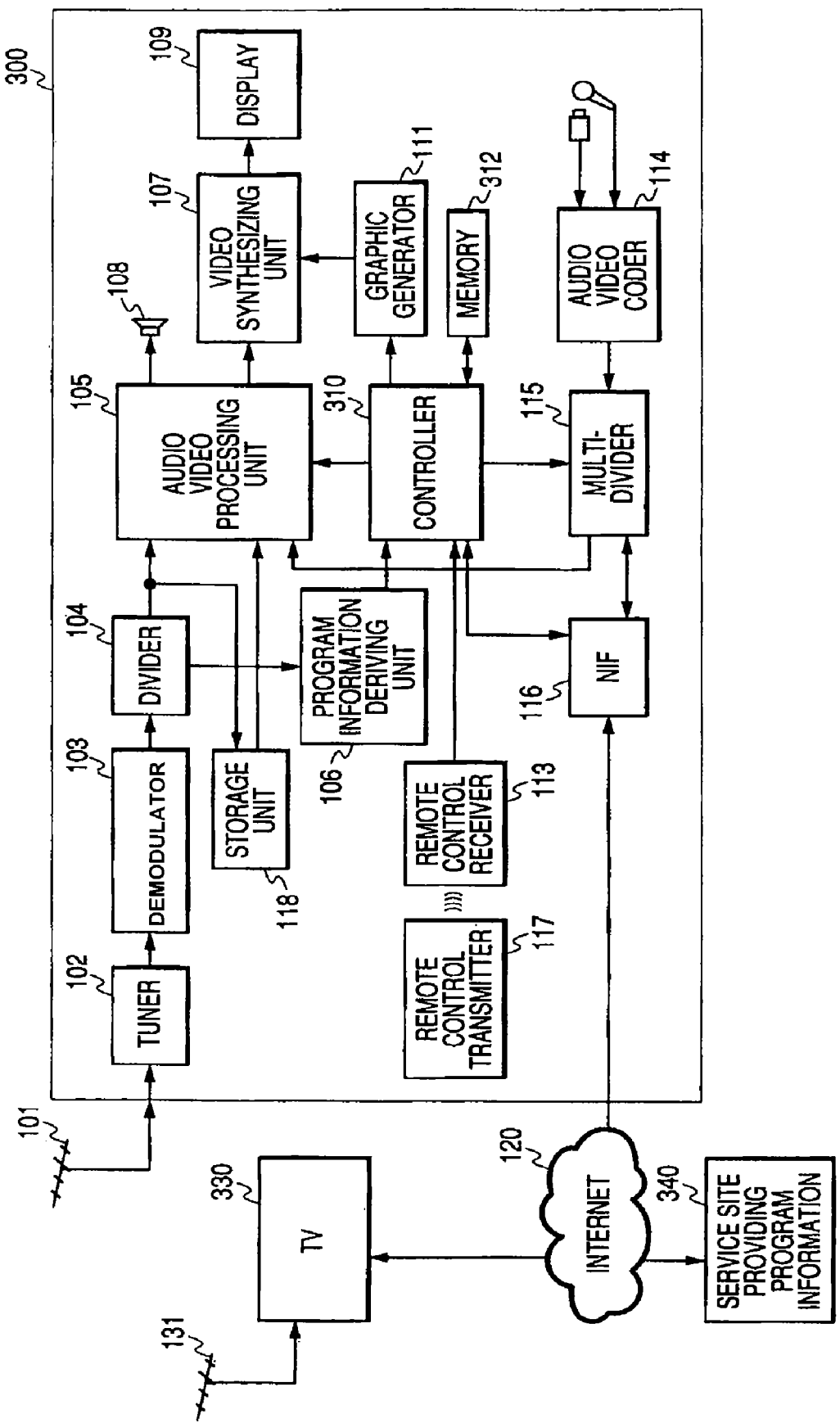
FIG. 19 is a schematic block diagram of a second embodiment of the present invention.

FIG. 19 shows a block diagram of the schematic configuration of a digital television receiver 300 as the second embodiment of the present invention. The digital television 300 receives a ground wave digital broadcast and/or a broadcast signal of a CATV, and displays a program table on the basis of program information separated from a demodulated signal, similarly to the digital television receiver 100. Moreover, the television receiver 300 receives a broadcast program in accordance with a channel tuning operation of a user, and decodes the received broadcast program to display it. Furthermore, the television receiver 300 has a television conversation function as communication means by means of audio and video. A controller 310 and a memory 312 for storing control programs and data are different from the controller 110 and the memory 112 of the digital television receiver 100, respectively. That is to say, the digital television receiver 300 is different from the digital television receiver 100 in its control mode.

A digital television receiver 330 equipped with a similar configuration and similar functions to those of the digital television receiver 300 is connected to the network 120. A service site providing program information 340 for providing program information related to television broadcast programs of all over the country is further connected to the network 120. The receivers 300 and 340 can obtain program information pertaining to receivable television broadcast programs in any area by requiring the program information with designation of the area by means of the site 340.

Figure 20:
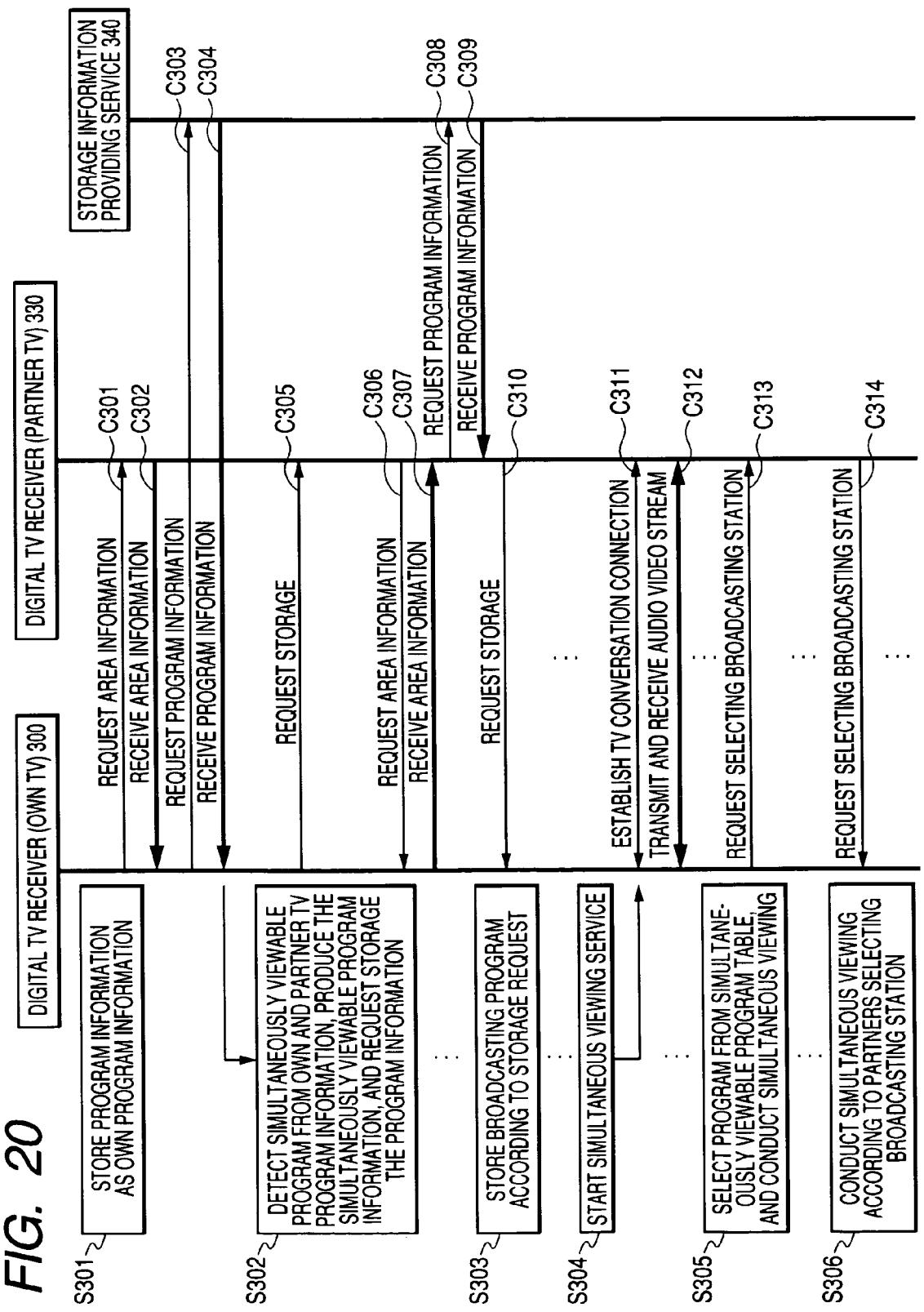
FIG. 20 is a flowchart of the simultaneous viewing operation of the second embodiment of the present invention.

FIG. 20 shows a flow of a simultaneous viewing operation of the digital television receiver 300. It is supposed that the own television is the digital television receiver 300, and that the partner television is the digital television receiver 330.

At Step S301 of FIG. 20, the controller 310 of the own television derives the program information included in a broadcasting wave with the program information deriving unit 106, and stores the derived program information in the memory 312 as own program information. Next, the own television requests an area information included in the program information which the partner television derived from a broadcasting wave and stored to the partner television through the network interface 116 (Step C101), and receives the area information (Step C302). The area information is one of the data included in the program information multiplexed in a broadcasting wave, and is the data indicating the area being the object of the program information.

The controller 310 accesses the service site providing program information 340 through the network, and requests the program information which is received in the area in which the partner television is set on the basis of the area information received from the partner television (Step C303), and receives the program information (Step C304). The controller 310 stores the program information from the site 340 in the memory 312 as the partner's program information.

FIGS. 4A and 4B show examples of the own program information and the partner's program information, which are stored in the memory 312, respectively. In the memory 312, the program information with regard to the broadcasting program stored in the storage unit 118 of the own television is stored as the own storage program information. In the present embodiment, the program e is stored and registered in the own storage program information.

The controller 310 derives programs which the own television and the partner television can simultaneously view from the own program information, the partner program information and the own storage program information which are stored in the memory 312, and forms simultaneously viewable program information (Step S302). The process is executed in accordance with the flow shown in FIG. 21.

Figure 21:
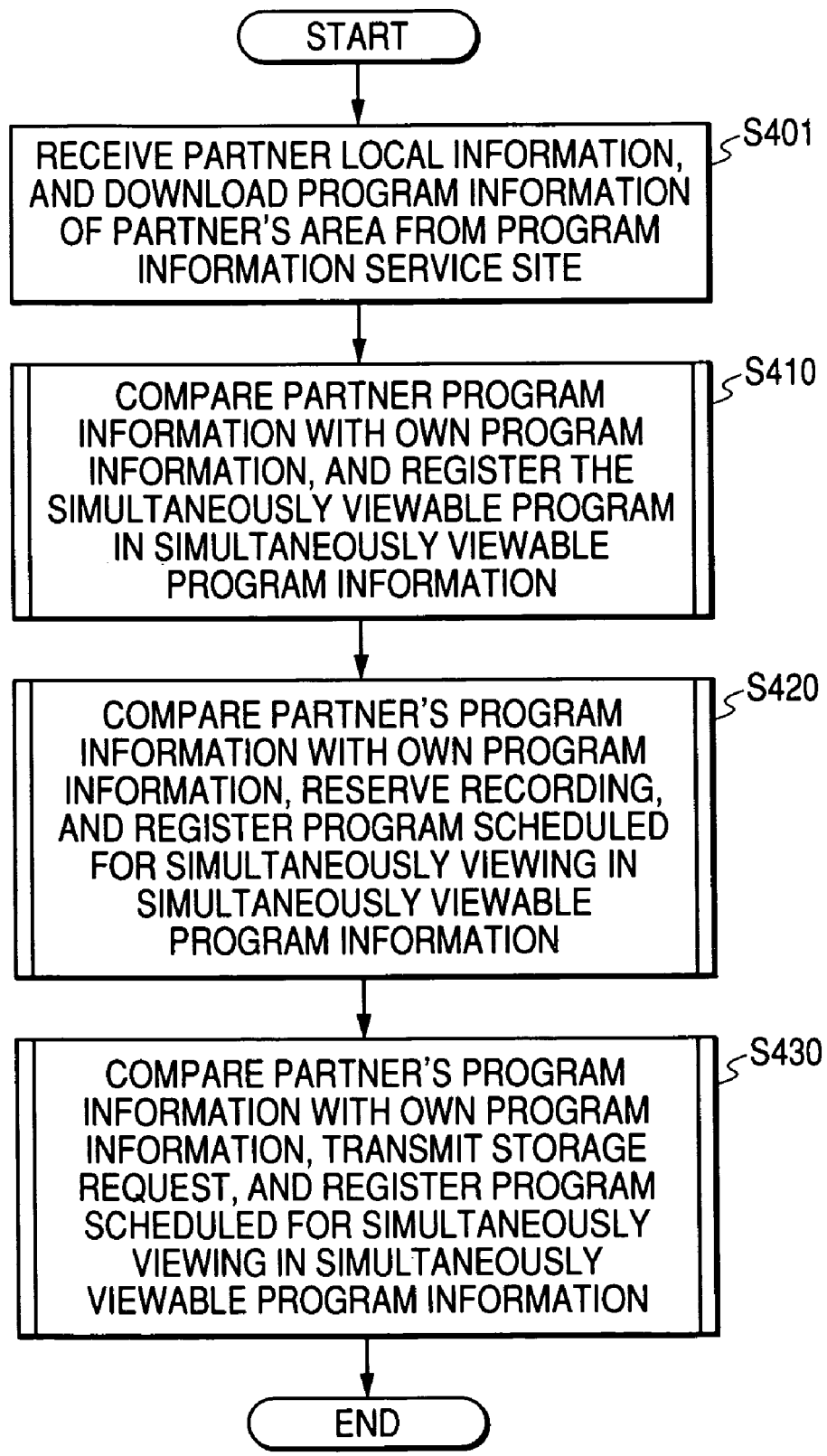
FIG. 21 is a detailed flowchart at Step S302 in the flow of the simultaneous viewing operation of the second embodiment of the present invention.
Figure 22:
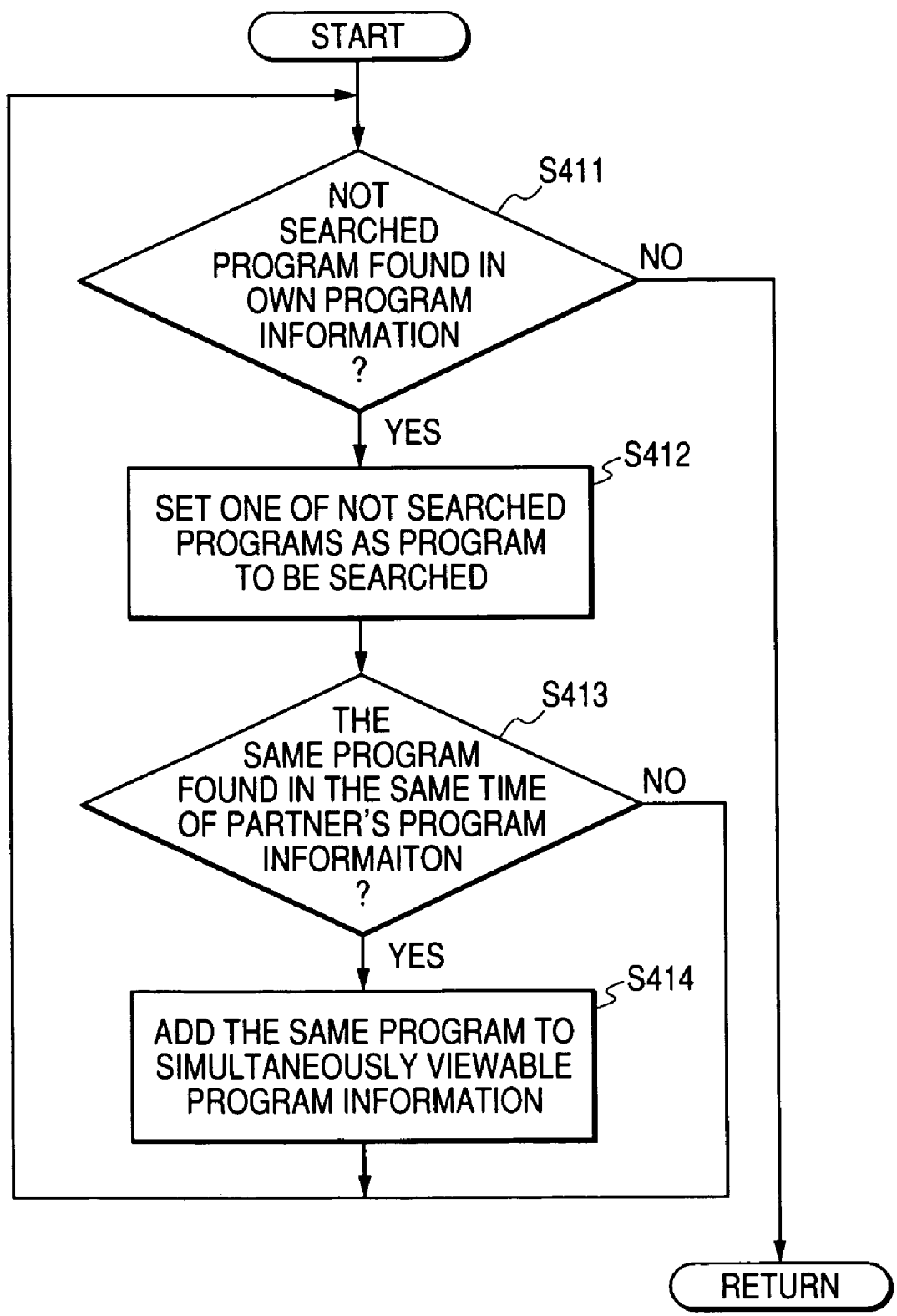
FIG. 22 is a detailed flowchart at Step S410 in the flowchart of Step S302.

In FIG. 21, at a first step, after the controller 310 has received the partner's program information (Step S401), the controller 310 compares the own program information with the partner's program information, and derives programs which will be broadcast at the same time by the own television and by the partner television to store the derived programs in the memory 312 as the simultaneously viewable program information (Step S410). The details of Step S410 are shown in FIG. 22.

Figure 23:
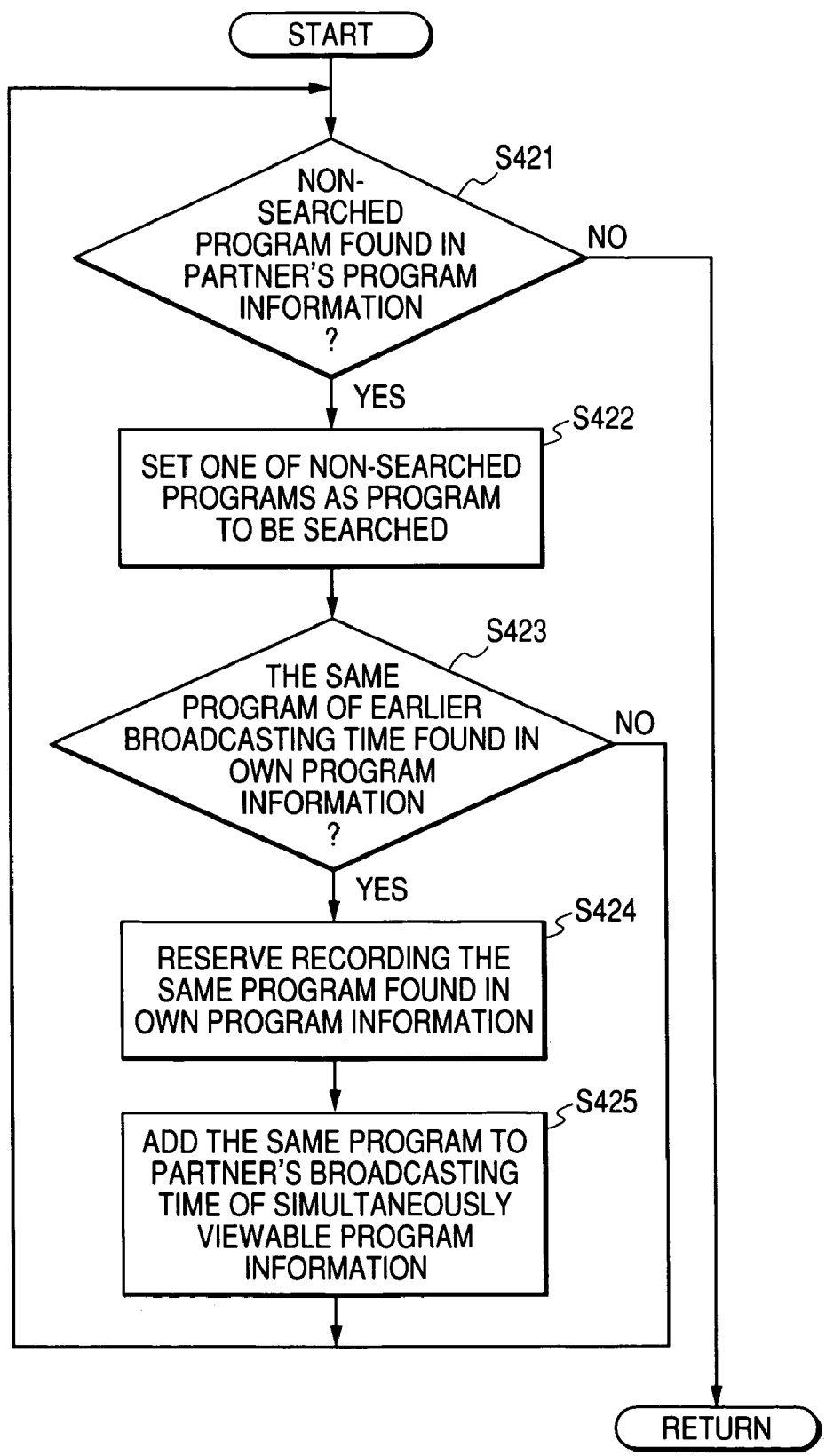
FIG. 23 is a detailed flowchart at Step S420 in the flowchart of Step S302.

At a second step, the programs which are included in both of the own program information and the partner's program information and have earlier broadcast time in the own program information in comparison with the broadcast time in the partner's program information are derived. Then, the derived programs are registered in the storage program information of the memory 312 for storing in the storage unit 117 by the reserve recording function. Simultaneously, the programs are registered in the simultaneously viewable program information as simultaneously viewable programs at the (late) broadcast time by the partner's program information (Step S420). The details of Step 420 are shown in FIG. 23.

Figure 24:
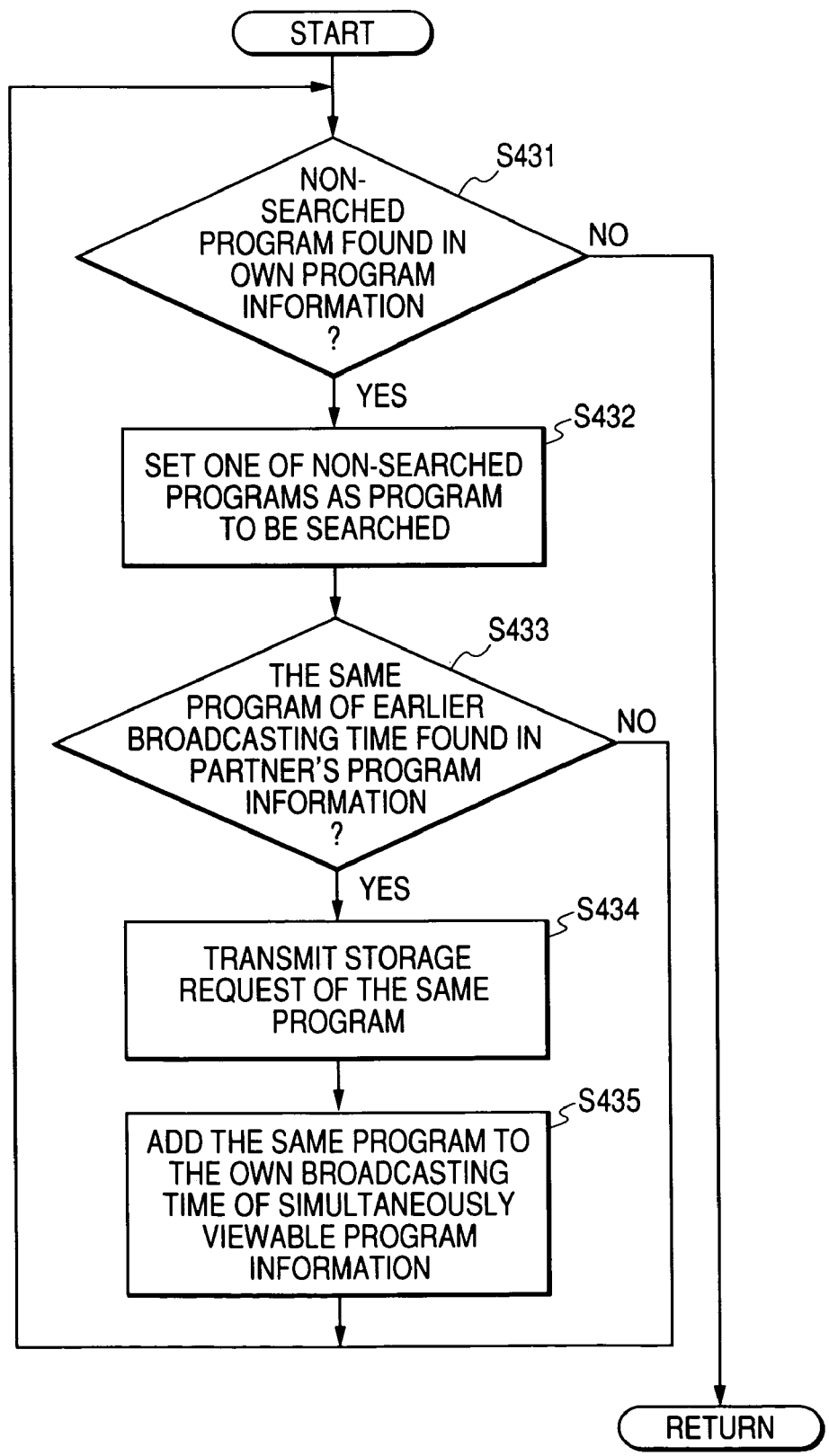
FIG. 24 is a detailed flowchart at Step S430 in the flowchart of Step S302.

At a third step, the controller 310 of the own television derives a program which is included in both of the partner's program information and the own program information and has an earlier broadcast time in the partner's program information in comparison with the broadcast time in the own program information. Then, the controller 310 transmits a storage request of the program to the partner television through the network for storing the program in the storage unit of the partner television by means of the reserve recording function of the partner television (Step C305). Moreover, the controller 310 registers the program in the simultaneously viewable program information as a simultaneously viewable program at the broadcasting time in the own program information (Step S430). The details of the operation at Step 430 are shown in FIG. 24.

FIGS. 25 to 28 show examples of the simultaneously viewable program information and own storage program information of the own television, which are produced by the processes described above in time series.

FIG. 25 shows the simultaneously viewable program information and own storage program information before the receiving of the partner's program information to derive a simultaneously viewable program. In the own stored program information, a program f is stored (registered) in the storage unit 117 by an operation before the description.

FIG. 26 shows the simultaneously viewable program information and the own storage program information at the time point when the simultaneously viewable program is registered by comparing the partner's program information with the own program information after the reception of the partner's program information (Step S410). Programs a1, a2, a3 and a4 of channel 1 and a program b1 of channel 2 are registered as the programs viewable at the same time by the two televisions in the own program information and the partner's program information shown in FIGS. 4A and 4B, respectively.

FIG. 27 shows the simultaneously viewable program information and the own storage program information at the time point of detecting the programs which are common in the own program information and the partner's program information and having the broadcast time earlier in the own program information than that in the partner's program information (Step S420). The program b2 to be broadcast in channel 2 is stored at the time of the reception thereof by the own television, and the stored program is reproduced at the time when the partner television can receive the same program. Thereby, the simultaneous viewing can be performed. Consequently, in the simultaneously viewable program information, the program b2 is registered at the broadcast time in the partner's program information, and the program b2 is registered at the broadcast time in the own program information as storage scheduled in the own storage program information.

FIG. 28 shows the simultaneously viewable program information and own storage program information at the time of comparing the own program information with the partner's program information again to derive the programs which are the same ones and to derive the one having a broadcast time in the partner's program information earlier than that in the own program information, and of transmitting a storage request to the partner television (Step S430). The simultaneous viewing can be performed by storing the program b3 receivable by the channel 3 of the partner television in advance to reproduce the program b3 at the time of the broadcast time in the own program information. Accordingly, the program b3 is registered at the broadcast time in the own program information as a simultaneously viewable program.

FIG. 29A shows an example of the configuration of data for one program to be registered in the storage program information. The data has the configuration almost similar to the configuration of the first embodiment (FIG. 16A), the configuration of the data is different from that of the first embodiment in that a "simultaneous viewing reservation" property is stored in the state data.

That is to say, as shown in FIGS. 29B and 29C, the "recording reservation" property is stored in the state data against the registration data of the own television, in which the storage (recording) reservation is performed. As shown in FIG. 29D, the following fact is shown. That is to say, in case of the registration data when the storage reservation has been performed on the basis of the detection of the simultaneously viewable program in the own television and when the storage (recording) reservation has been performed in response to a storage request from the partner television, a "reserve simultaneously viewing" property is stored in addition to the "recording reservation" property, and the stored program is one prepared for simultaneous viewing.

As shown in FIG. 29E, the "reserve simultaneously viewing" property is held until the reproduction of the program by the simultaneous viewing after the receiving and storing the reserved broadcast program. When the program is reproduced by the performance of the simultaneous viewing or when the scheduled time of the simultaneous viewing has passed, the "reserve simultaneously viewing" property is deleted (FIG. 29F), and it is shown that the reservation for the simultaneous viewing has been released.

In FIG. 20, when the simultaneously viewable program information and the storage program information have been produced, the controller 310 waits that the simultaneous viewing service is started by a user. When a request of the area prefecture district information is transmitted from the partner television during the waiting (Step C305), the controller 310 takes out the area prefecture district information included in the own program information stored in the memory 317, and transmits the taken area prefecture district information to the partner television through the network interface 116 (Step C307). When the controller 310 received the request of the storage program information (Step C310), the controller 310 registers the storage reserve in the own storage program information.

When the scheduled program storage time included in the own storage program information has arrived, the controller 310 receives the broadcast in the reception channel in accordance with the own storage program information, and stores the corresponding program in the storage unit 118 to execute the recording reservation. Then, the controller 310 updates the state part of the program data in the simultaneously viewable program information and the storage program information to the recorded property, and stores the link to the program data stored in the storage unit 118 as content designating information (Step S303).

Figure 30:
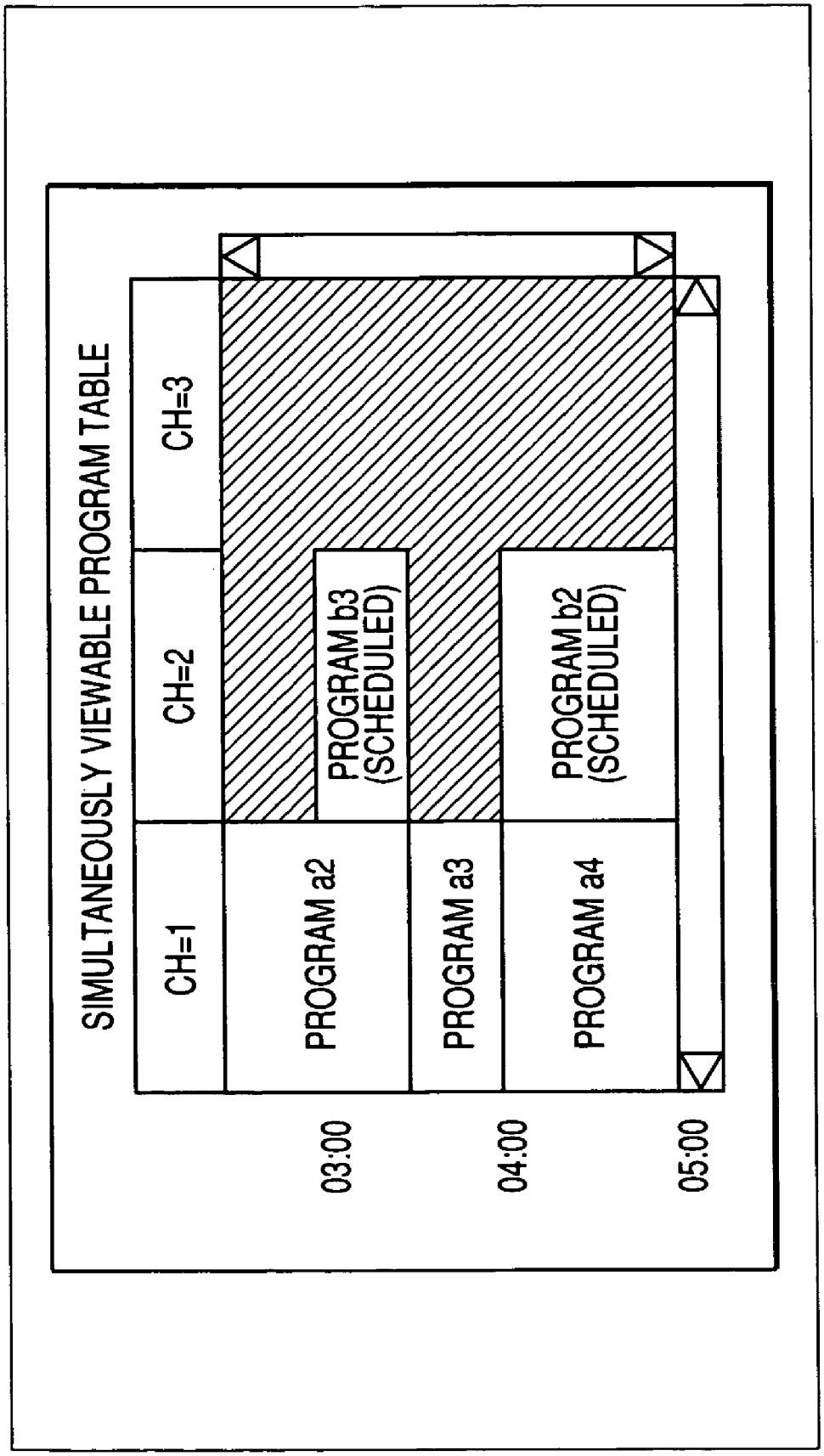
FIG. 30 is a display example of a simultaneously viewable program table of the second embodiment of the present invention.
Figure 35A:
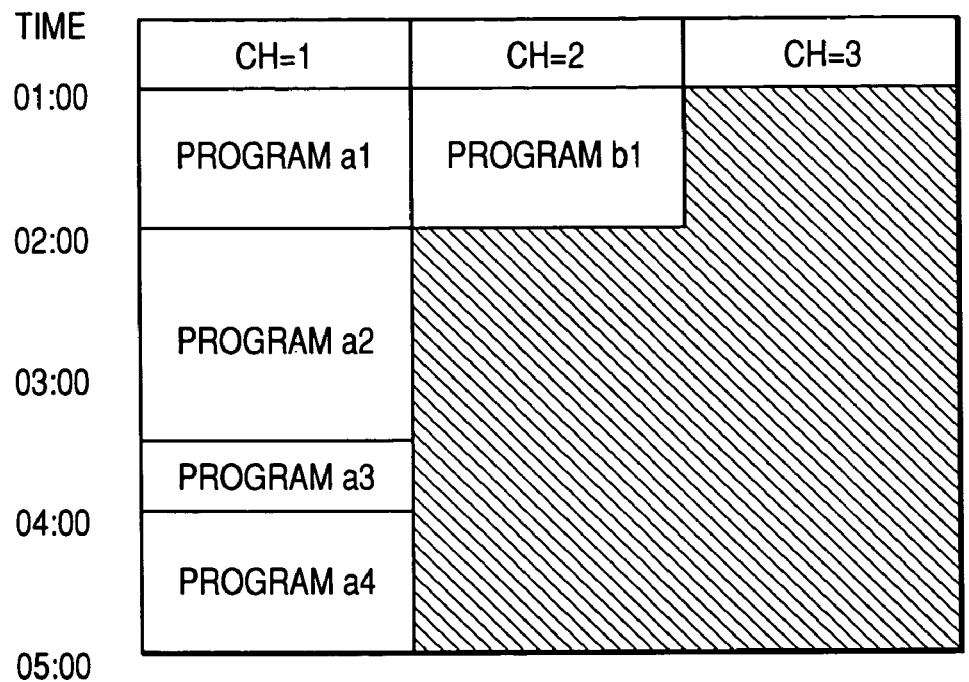
FIG. 35A is a schedule of television programs which a television receiver 800 can simultaneously view by the prior art.
Figure 35B:
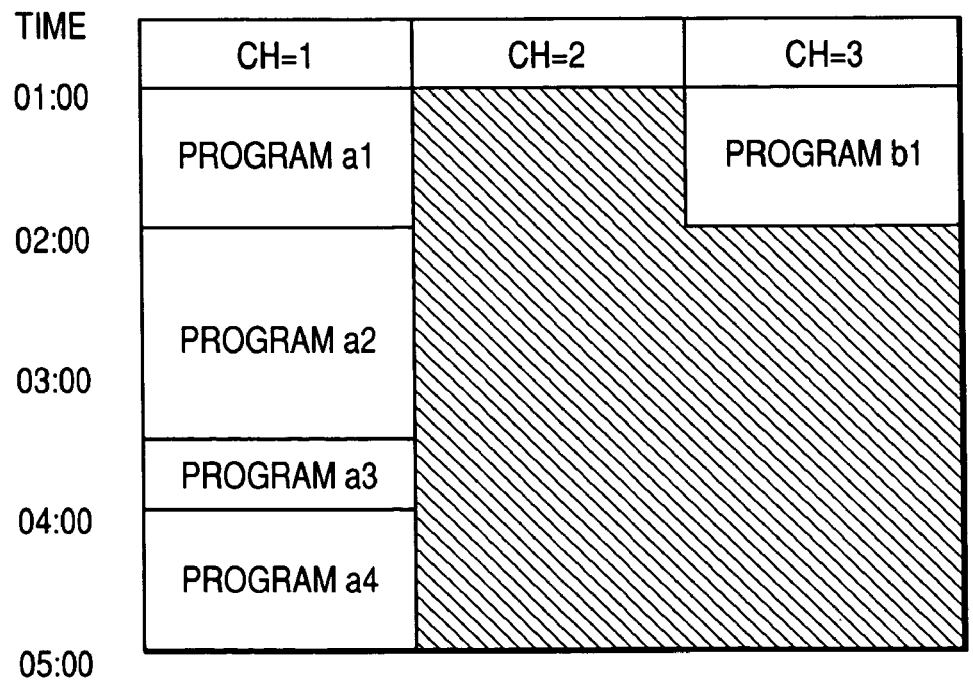
FIG. 35B is a schedule of television programs which a television receiver 820 can simultaneously view by the prior art.

The user operates the television receiver 300 with the remote control 117, and thereby can display the simultaneously viewable program table based on the simultaneously viewable program information on the display 109 similarly to the first embodiment. FIG. 30 shows a display example of the simultaneously viewable program table. In FIG. 30, the programs simultaneously viewable during about 3:00 to 7:00 are displayed by the scroll function of the screen. The user looks this table to know that it is possible to watch a plurality of television programs together with the user of the partner television in this time zone.

The user operates the television receiver 300 with the remote control 117 to display the storage program table based on the storage program information on the display 109, and can reproduce a desired program from the list of the programs stored in the storage unit 118. That is to say, when the user instructs the display of the storage program table by the operation of an appropriate menu through the remote control, the controller 310 reads the own storage program information stored in the memory 317, and controls the graphic generator 111 to produce a display screen of the program table, and the display screen is displayed on the display 109 by the synthesizing unit 107.

FIG. 31 shows a display example of the storage program table displayed in such a way. The example shown in FIG. 31 is based on the storage program information after the performance of the storage request (Step C310 in FIG. 20) of the program b3 from the partner television in addition to the storage program information shown in FIG. 23, and the time has passed 03:00 in the state of the completion of the storage operation of the program b3. That is to say, it is the state in which the programs f and b3 are stored in the storage unit 118.

When the user selects the program f by an appropriate remote control operation, the controller 310 controls each unit to reproduce the data of the program f in the storage unit 118 by means of the content information of the storage program information. Thereby, the program f is reproduced, and is displayed on the display 109.

Similarly, when the program b2 is selected in the storage program table shown in FIG. 31, because the "simultaneous viewing reservation" property is designated in the state data of the storage program information, the controller 310 controls the graphic generator to display a dialogue shown in FIG. 32 before starting the control for generating the program b2. Because the program b2 is a program stored with an object of being simultaneously viewed with the partner television during the time from 04:00 to 05:00, the controller 310 requests the confirmation again of the reproduction to be performed in the form of being not the simultaneous viewing against the schedule. The user selects any one of the items of the sole reproduction of the program b2 against the schedule and the stopping of the reproduction to perform the reproduction of the program b2 at the chance of the simultaneous viewing in accordance with the schedule on the basis of the acceptance of the error of the selection operation by an appropriate remote control operation.

In FIG. 20, when the user instructs the start of the simultaneous viewing with the user of the partner television by an appropriate menu operation through the remote control or the like, the controller 310 establishes a television conversation connection with the partner television 330 through the network interface 116 (Step C311), and starts to exchange (transmit and receive) mutual audio video streams (Step C312). The user makes the simultaneously viewable program table exemplified in FIG. 31 be displayed by an appropriate remote control operation, and selects any one of the programs for starting the simultaneous viewing while communicating with the user of the partner television by means of audio and video of the television conversation. It is the same thing as that in the first embodiment that the controller 310 transmits the channel tuning request to the partner television through the network interface 116 for enabling the simultaneous viewing of the selected program. It is also the same thing as that in the first embodiment that, when the use of the partner television has selected a program for simultaneous viewing in the partner television, a channel tuning request is transmitted from the partner television and the channel tuning of the own television is performed to perform the simultaneous viewing.

In the present embodiment, the own program information is compared with the partner program information, and a program having an earlier broadcast time in the own program information than the broadcast time in the partner's program information is detected. A schedule of storage of the detected program is registered, and at the same time the detected program is also registered in the simultaneously viewable program information as the simultaneously viewable program. However, the registration of the program in the simultaneously viewable program information may be performed after the actual execution of the storage (recording) and the completion thereof.

The own program information is compared with the partner program information, and a program having an earlier broadcast time in the own program information than the broadcast time in the partner's program information is detected. A storage request of the detected program is transmitted to the partner television, and at the same time the detected program is also registered in the simultaneously viewable program information as the simultaneously viewable program. However, the registration of the program in the simultaneously viewable program information may be performed after the actual execution of the storage (recording) and the completion thereof.

In the present embodiment, the detection of the simultaneously viewable program is described to be performed also in the partner television 330 similarly to the own television 300. However, the partner television 330 operates in accordance with the description of the present embodiment with regard to the storage request and the channel tuning request from the own television 300, and on the other hand the configuration in which the partner television does not detect any simultaneously viewable programs or the configuration in which the partner television does not perform the display of the simultaneously viewable program table may be adopted. In such cases, because the partner television cannot select any simultaneously viewable programs, the channel tuning request from the partner television to the own television is not performed.

The detection of a simultaneously viewable program may be performed in the way in which a scheduled time zone of the performance of simultaneous viewing is designated in advance and only the programs capable of being simultaneously viewed in that time zone. In this case, the number of the programs which have been stored in advance for simultaneous viewing is limited, and then the method has an advantage that capacity of the storage unit 117 can be reduced.

In the embodiments 1 and 2 described above, the own program information is compared with the partner's program information, and a program having an earlier broadcast time in the own program information than the broadcast time in the partner's program information. Then, the detected program is automatically recorded at the broadcast time of the program in the own program information. However, the confirmation of recording before the recording of the program may be performed to the user. In this case, the configuration for performing the display of the confirmation of the recording on the display 109 in order that the user may perform the operation of determining the start of recording before the television receiver performs the recording can be adopted.

In the embodiments 1 and 2, the own program information is compared with the partner's program information, and a program having an earlier broadcast time in the own program information than the broadcast time in the partner's program information. Then, the detected program is stored, and the stored program is reproduced at the broadcast time of the partner's program information. However, the simultaneous viewing may be performed in the following way. That is to say, a specific program is selected, and the selected specific program is stored in the own television and in the partner television. Then, at a specific time after the both of the broadcast times of the specific program in the own program information and in the partner's program information, the specific program is simultaneously reproduced on the own television and on the partner television to perform the simultaneous viewing. For that sake, at least one of the own television and the partner television transmits specific time information, and the own television and the partner television simultaneously reproduce the program on the basis of the information. In this case, because both of the own television and the partner television record the program, the step of comparing the own program information with the partner program information to detect a program having an earlier broadcast time in the own program information than the broadcast time in the partner's program information may be omitted.

In the embodiment 2, the detection of the simultaneously viewable program is described to be performed by both of the own television and the partner television. However, a configuration in which a program information detection apparatus other than the own television and the partner television performs the detection of the simultaneously viewable program can be adopted. The program information detection apparatus may be a server. An operation flow concerning the simultaneous viewing of an own television and a partner television in a configuration composed of the own television 500, the partner television 530, a server 540 for detecting simultaneously viewable program, which is the above-mentioned program detection apparatus, and a program information supplying service 550 is shown in FIG. 33. First, the own television 500 requests the partner television 530 of the area information concerning the location of the partner television (Step C301), and the own television receives the area information (Step C302). Next, the own television 500 requests the server 540 for detecting simultaneously viewable program of simultaneously viewable program information (Step C401). The server 540 for detecting simultaneously viewable program receives the own program information and the partner program information from the program information supply service 550 on the basis of the area information of the own television 500 and the partner television 530. Then, the server 540 for detecting simultaneously viewable program detects a simultaneously viewable program form the own program information and the partner program information to produce the simultaneously viewable program information. The produced simultaneously viewable program information receives the own television 500 (Step C402), and requests the partner television 530 of the storage of the simultaneously viewable program on the basis of the simultaneously viewable program information (Step S501). The partner television 530 also performs the similar procedures. By the operation flow described above, the simultaneous viewing by the own television and the partner television can be performed.

Incidentally, the function of the server 540 for detecting simultaneously viewable program may be owned by the program information supply service 550. In this case, the own television 500 requests the program information supply service 550 of the simultaneously viewable program information. As described above, by detecting the simultaneously viewable program information by the detection means other than the television receiver, the configuration of the television receiver can be made to be simpler.

In the embodiments 1 and 2, the configuration in which the television receiver includes the display is exemplified. However, the configuration of the so-called set-top box, in which the television receiver does not include any displays, can be adopted. In this case, the screen synthesizing unit includes the function of outputting a video display signal for displaying the video on a connected display, and an audio signal outputting unit included in the audio video processing unit includes an audio signal outputting function for connecting a suitable speaker. The other functions and operations of the other components are the same as those described above.

Moreover, in the embodiments 1 and 2, the configuration in which the television receiver includes the storage unit is exemplified. However, the configuration of the television receiver which does not include any storage unit can be adopted. The television receiver includes recording and reproducing control unit and the television receiver may be connected to recording and reproducing device (storage unit). In this case, the television receiver directs the recording and reproducing device to record program and to reproduce recorded program.

Moreover, the present invention includes the state of a computer-executable program including program codes for making a television receiver or a set-top box (computer) execute the embodiments described above. Consequently, the present invention may be realized as follows. That is to say, a television receiver or a set-top box. (computer), both having no functions described about the embodiments 1 and 2, is prepared to download the programs for executing the method described with regard to the embodiments 1 and 2. Then, the television receiver or the set-top box executes the method described related to the embodiments 1 and 2.

This application claims priority from Japanese Patent Application No. 2003-416733 filed on Dec. 15, 2003, which is hereby incorporated by reference herein.

What is claimed is:

1. A television receiver comprising:
  a receiving unit for receiving a broadcast signal in a first area;
  an obtaining unit for obtaining program information relating to a program broadcasted in the first area, and program information relating to a program broadcasted in a second area; and
  a control unit for detecting, from common programs distributed in both of the first and second areas, based on the program information obtained by the obtaining unit, a common program having a broadcasting time earlier in the first area than in the second area, and for storing the detected common program in a storage unit, wherein the second area is different from the first area, and wherein the control unit conducts controlling for playing the detected common program, having been stored in the storage unit, simultaneously with a broadcast time of the detected common program in the second area.

2. The television receiver according to claim 1, wherein the control unit generates an electronic program guide for the notifying that the detected common program stored in the storage unit is viewable simultaneously with a broadcast time of the detected common program in the second area.

3. The television receiver according to claim 1, wherein the obtaining unit obtains, from the broadcast signal received by the receiving unit, the program information relating to the program broadcasted in the first area, and obtains, through the network, the program information relating to the program broadcasted in the second area.

4. The television receiver according to claim 3, wherein the obtaining unit obtains the program information relating to the program broadcasted in the second area, from another television receiver, which receives the broadcast signal in the second area, or from a program information providing apparatus managing the program information relating to a program broadcasted in a plurality of areas including the second area.

5. A television receiver comprising:
  a receiving unit for receiving a broadcast signal in a first area;
  an obtaining unit for obtaining program information relating to a program broadcasted in the first area, and program information relating to a program broadcasted in a second area; and
  a control unit for detecting, from common programs distributed in both of the first and second areas, based on the program information obtained by the obtaining unit, a common program having a broadcasting time earlier in the second area than in the first area, and for transmitting, to another television receiver, which receives the broadcast signal in the second area, a storage request signal to store the detected common program therein,
  wherein the second area is different from the first area, and
  wherein the control unit transmits, to the another television receiver, a play request signal to play the common program, having been stored in the another television receiver, simultaneously with a broadcast time of the detected common program in the first area.

6. An apparatus-implemented information processing method comprising steps of:
  receiving a broadcast signal in a first area;
  obtaining program information relating to a program broadcasted in the first area, and program information relating to a program broadcasted in a second area and
  detecting, from common programs distributed in both of the first and second areas, based on the program information obtained in the obtaining step, a common program having a broadcasting time earlier in the first area than in the second area, and storing the detected common program in a storage unit,
  wherein the second area is different from the first area, and
  wherein controlling is conducted for playing the detected common program, having been stored in the storage unit, simultaneously with a broadcast time of the detected common program in the second area.

7. An apparatus-implemented information processing method comprising steps of:
  receiving a broadcast signal in a first area;
  obtaining program information relating to a program broadcasted in the first area, and program information relating to a program broadcasted in a second area; and
  detecting, from common programs distributed in both of the first and second areas, based on the program information obtained in the obtaining step, a common program having a broadcasting time earlier in the second area than in the first area, and for transmitting, to a television receiver receiving the broadcast signal in the second area, a storage request signal to store the detected common program therein,
  wherein the second area is different from the first area, and
  wherein, to the another television receiver, a play request signal is transmitted to play the common program, having been stored in the another television receiver, simultaneously with a broadcast time of the detected common program in the first area.

8. A computer-readable storage medium storing a computer-executable program for implementing a method according to claim 6.

9. A computer-readable storage medium storing a computer-executable program for implementing a method according to claim 7.

* * * * *